(12) United States Patent
Rotter et al.

(10) Patent No.: US 11,125,195 B2
(45) Date of Patent: Sep. 21, 2021

(54) CARBURETOR DRAIN

(71) Applicant: Kohler Co., Kohler, WI (US)

(72) Inventors: Terrence Rotter, Sheboygan Falls, WI (US); Todd Baumann, Howards Grove, WI (US); Gary Stenz, Mt. Calvary, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 17/029,322

(22) Filed: Sep. 23, 2020

(65) Prior Publication Data
US 2021/0003106 A1 Jan. 7, 2021

Related U.S. Application Data

(63) Continuation of application No. 16/560,334, filed on Sep. 4, 2019, now Pat. No. 10,823,124, which is a continuation of application No. 15/923,748, filed on Mar. 16, 2018, now Pat. No. 10,465,642.

(60) Provisional application No. 62/477,154, filed on Mar. 27, 2017.

(51) Int. Cl.
F02M 5/12 (2006.01)
F02M 37/00 (2006.01)
A01D 34/00 (2006.01)
F02M 37/04 (2006.01)
F02M 5/02 (2006.01)

(52) U.S. Cl.
CPC ....... *F02M 37/0052* (2013.01); *A01D 34/001* (2013.01); *F02M 5/02* (2013.01); *F02M 37/046* (2013.01)

(58) Field of Classification Search
CPC .... F02M 37/0052; F02M 37/046; F02M 5/02; F02M 19/00; A01D 34/001

USPC .............................................. 123/517, 185.3
See application file for complete search history.

(56) References Cited

U.S. PATENT DOCUMENTS

| 1,497,003 | A | 6/1924 | Soule |
| 3,048,157 | A | 8/1962 | Gregory et al. |
| 3,290,871 | A | 12/1966 | Haas |
| 3,324,842 | A | 6/1967 | Haas |
| 3,534,721 | A | 10/1970 | King |
| 3,640,257 | A | 2/1972 | Cornelius |
| 3,664,774 | A | 5/1972 | Tupper |
| 3,780,996 | A | 12/1973 | Nutten |

(Continued)

FOREIGN PATENT DOCUMENTS

| CN | 1880752 A | 12/2006 |
| CN | 102128102 A | 7/2011 |

(Continued)

OTHER PUBLICATIONS

Chinese Office Action for Chinese Application No. 201810259629.6 dated Jul. 24, 2020.

(Continued)

*Primary Examiner* — Hai H Huynh
(74) *Attorney, Agent, or Firm* — Lempia Summerfield Katz LLC

(57) ABSTRACT

A carburetor includes a carburetor bowl, a fuel supply pipe, a fuel drain pipe, and a valve. The carburetor bowl is configured to store fuel and provide the fuel to an air passage. The fuel supply pipe is connected a fuel tank and the carburetor bowl. The fuel drain pipe is connected to the carburetor bowl and the fuel supply line. The valve for the fuel drain pipe is configured to open and close in response to an orientation of the carburetor.

18 Claims, 24 Drawing Sheets

(56) References Cited

U.S. PATENT DOCUMENTS

| | | |
|---|---|---|
| 3,783,849 A | 1/1974 | Bramfitt |
| 3,825,238 A | 7/1974 | Nishihara et al. |
| 3,834,676 A | 9/1974 | Miyazaki |
| 3,845,749 A | 11/1974 | Dale |
| 3,906,921 A | 9/1975 | Tillotson |
| 3,942,505 A | 3/1976 | Tillotson |
| 4,099,939 A | 7/1978 | Vancheri et al. |
| 4,111,176 A | 9/1978 | Fenton et al. |
| 4,316,355 A | 2/1982 | Hoff |
| 4,394,893 A | 7/1983 | Kronich |
| 4,416,107 A | 11/1983 | Hoff |
| 4,437,448 A | 3/1984 | Billingsley |
| 4,456,216 A | 6/1984 | Boruta |
| 4,757,885 A | 7/1988 | Kronich |
| 4,770,822 A | 9/1988 | Sejimo |
| 4,893,593 A | 1/1990 | Sejimo et al. |
| 5,058,544 A | 10/1991 | Guntly et al. |
| 5,711,901 A | 1/1998 | Berg et al. |
| 5,732,685 A | 3/1998 | Nakamura |
| 5,750,056 A | 5/1998 | Pitman |
| 5,810,033 A | 9/1998 | Nakayama et al. |
| 5,836,290 A | 11/1998 | Gilbert |
| 5,891,369 A | 4/1999 | Tuggle et al. |
| 5,894,833 A | 4/1999 | Kikuchi et al. |
| 6,000,369 A | 12/1999 | Koizumi |
| 6,029,619 A | 2/2000 | Mitchell |
| 6,082,323 A | 7/2000 | Winberg |
| 6,135,429 A | 10/2000 | Woody |
| 6,158,368 A | 12/2000 | Nanami |
| 6,176,206 B1 | 1/2001 | Ishikawa |
| 6,213,083 B1 | 4/2001 | Winberg |
| 6,227,176 B1 | 5/2001 | Hettmann |
| 6,244,572 B1 | 6/2001 | Delsole |
| 6,354,571 B1 | 3/2002 | Gerhardy |
| 6,374,810 B1 | 4/2002 | Pattullo |
| 6,425,573 B1 | 7/2002 | Suzuki |
| 6,439,548 B2 | 8/2002 | Masunaga |
| 6,446,939 B1 | 9/2002 | Hoppe et al. |
| 6,481,403 B1 | 11/2002 | Ashcraft et al. |
| 6,561,495 B2 | 5/2003 | Woody |
| 6,595,500 B2 | 7/2003 | Osburg et al. |
| 6,655,335 B2 | 12/2003 | Imafuku et al. |
| 6,672,571 B2 | 1/2004 | Gangler et al. |
| 6,715,737 B2 | 4/2004 | Galka et al. |
| 6,729,608 B1 | 5/2004 | Del Sole |
| 6,895,914 B2 | 5/2005 | Rado et al. |
| 6,913,250 B2 | 7/2005 | Osburg |
| 7,165,536 B2 | 1/2007 | Kirk et al. |
| 7,210,441 B1 | 5/2007 | Burns |
| 7,263,981 B2 | 9/2007 | Woody |
| 7,287,743 B1 | 10/2007 | Gliniecki |
| 7,424,884 B2 | 9/2008 | Woody |
| 7,467,785 B2 | 12/2008 | Braun |
| 7,527,248 B2 | 5/2009 | Cobb, Jr. |
| 7,568,472 B2 | 8/2009 | Woody |
| 7,600,505 B2 | 10/2009 | Pattullo |
| 7,690,342 B2 | 4/2010 | Gliniecki et al. |
| 7,775,189 B2 | 8/2010 | Bejcek et al. |
| 7,775,194 B2 | 8/2010 | Kono et al. |
| 7,784,440 B2 | 8/2010 | Yuasa |
| 7,913,659 B2 | 3/2011 | Maupin |
| 8,069,830 B2 | 12/2011 | Brown |
| 8,141,544 B1 | 3/2012 | Bills |
| 8,308,144 B2 | 11/2012 | Saito |
| 8,347,913 B2 | 1/2013 | Zhu |
| 8,403,654 B2 | 3/2013 | Podesta |
| 8,539,922 B2 | 9/2013 | Brown |
| 8,550,050 B2 | 10/2013 | Taniguchi |
| 8,631,777 B2 | 1/2014 | Brown et al. |
| 8,632,057 B2 | 1/2014 | Saito |
| 8,899,213 B2 | 12/2014 | Bejcek et al. |
| 8,925,509 B2 | 1/2015 | Warfel |
| 9,033,682 B2 | 5/2015 | Thalmann |
| 9,038,356 B2 | 5/2015 | Shao et al. |
| 9,062,629 B2 | 6/2015 | Burns et al. |
| 9,062,630 B2 | 6/2015 | Kus |
| 9,103,299 B2 | 8/2015 | Warfel |
| 9,433,147 B2 | 9/2016 | Schmalz |
| 9,462,747 B2 | 10/2016 | Schmalz |
| 9,562,495 B1 | 2/2017 | Tucak |
| 9,562,496 B1 | 2/2017 | Roberts |
| 9,574,521 B2 | 2/2017 | Krup |
| 9,599,066 B2 | 3/2017 | Burns |
| 9,777,683 B2 | 10/2017 | Thomas |
| 10,465,642 B2 | 11/2019 | Rotter |
| 2001/0013665 A1 | 8/2001 | Masunaga |
| 2001/0032601 A1 | 10/2001 | Galka |
| 2002/0073671 A1 | 6/2002 | Kucera |
| 2002/0084117 A1 | 7/2002 | Joseph |
| 2002/0135081 A1 | 9/2002 | Woody |
| 2003/0056481 A1 | 3/2003 | Trefz |
| 2003/0062633 A1 | 4/2003 | Woody |
| 2005/0274364 A1 | 12/2005 | Kirk |
| 2006/0260587 A1 | 11/2006 | Woody |
| 2008/0178850 A1 | 7/2008 | Bejcek |
| 2010/0280712 A1 | 11/2010 | Bowman |
| 2011/0140290 A1 | 6/2011 | Kumagai |
| 2013/0075174 A1 | 3/2013 | Jones, Jr. |
| 2013/0111866 A1 | 5/2013 | Schmalz |
| 2013/0119567 A1 | 5/2013 | Burns et al. |
| 2013/0160740 A1 | 6/2013 | Kamimura |
| 2013/0206114 A1 | 8/2013 | Bejcek |
| 2013/0212996 A1 | 8/2013 | Shao et al. |
| 2014/0026854 A1 | 1/2014 | Lindstrom et al. |
| 2014/0102064 A1 | 4/2014 | Yamaoka et al. |
| 2014/0196688 A1 | 7/2014 | Chen |
| 2015/0083090 A1 | 3/2015 | Warfel |
| 2015/0152813 A1 | 6/2015 | Krup |
| 2016/0040628 A1 | 2/2016 | Braun |
| 2018/0119646 A1 | 5/2018 | Xue |
| 2018/0274503 A1 | 9/2018 | Rotter |
| 2019/0390637 A1 | 12/2019 | Rotter |

FOREIGN PATENT DOCUMENTS

| | | |
|---|---|---|
| CN | 104481738 A | 4/2015 |
| CN | 204299723 U | 4/2015 |
| CN | 205779309 U | 12/2016 |
| CN | 206092212 U | 4/2017 |
| CN | 206280175 U | 6/2017 |
| EP | 2589284 B1 | 3/2016 |
| GB | 6101132 A | 10/1948 |
| GB | 766291 A | 1/1957 |
| JP | 6140453 A | 2/1986 |
| JP | 61200373 A | 9/1986 |
| JP | 03003955 A | 1/1991 |
| JP | 07008549 U | 2/1995 |
| JP | 3130175 B2 | 2/2007 |
| JP | 2009180146A A | 8/2009 |
| JP | 2010048232 A | 3/2010 |
| JP | 6148571 B2 | 5/2017 |
| JP | 2018053725 A | 4/2018 |
| NO | 2018155020 A1 | 8/2018 |

OTHER PUBLICATIONS

Chinese Office Action for Chinese Patent Application No. 201810259629.6, dated Feb. 3, 2020.

Echo, Inc. "Pas-225 Pro Attachment Series: Operator's Manual" p. 1-32. Publication Date: Sep. 2013.

CARBURETOR DRAIN

CROSS REFERENCE TO PRIOR APPLICATIONS

This application is a continuation under 37 C.F.R. § 1.53(b) and 35 U.S.C. § 120 of U.S. patent application Ser. No. 16/560,334, which is a continuation of U.S. patent application Ser. No. 15/923,748 filed Mar. 16, 2018 which claims priority benefit of Provisional Application No. 62/477,154 filed Mar. 27, 2017 hereby incorporated by reference in their entirety.

FIELD

This disclosure relates in general to a carburetor or a device that mixes fuel and air for an internal combustion engine, and more specifically, to apparatus and techniques for draining a bowl of a carburetor to remove stale fuel from the bowl.

BACKGROUND

A carburetor regulates the speed and volume of air drawn into an internal combustion engine, which controls the amount of fuel that is mixed with the air and provided to the combustion chamber of the internal combustion engine. The carburetor may include a bowl that houses a quantity of fuel at any given time when the engine is running so that fuel is always available and ready for mixing with the flow of air.

As a consequence of fuel in the bowl always available for use, some fuel may remain in the bowl after the engine is no longer running. Fuel that remains in the bowl for a long period of time may become stale. Long periods of time may occur during the off-season, for example, when an engine is not used during winter. Several problems may arise with stale fuel. The stale fuel may lose volatility and fail to provide sufficient combustion for operation of the engine. The stale fuel may at least partially evaporate and leave behind sediments or residue that clog components of the carburetor.

The apparatus and techniques described herein prevent or lessen the effects of stale fuel in the bowl of a carburetor.

BRIEF DESCRIPTION OF THE DRAWINGS

Exemplary embodiments are described herein with reference to the following drawings.

DETAILED DESCRIPTION

Figure 1A:
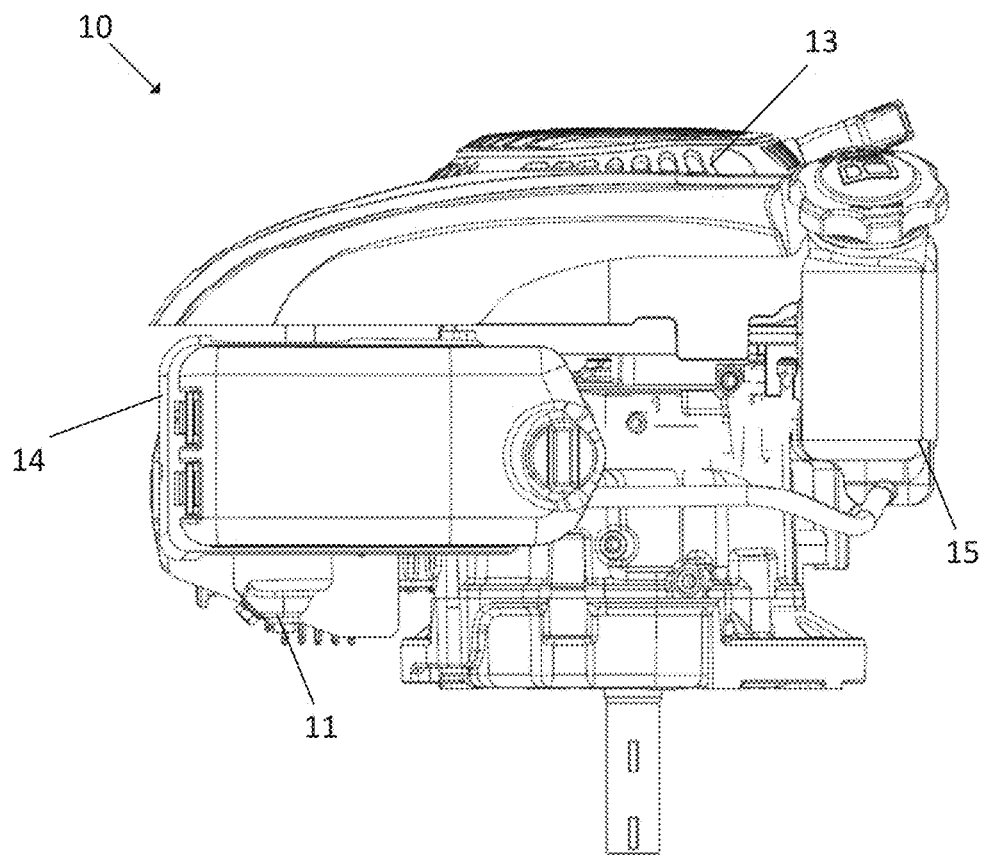
FIG. 1A illustrates a side view of an engine including a carburetor.
Figure 1B:
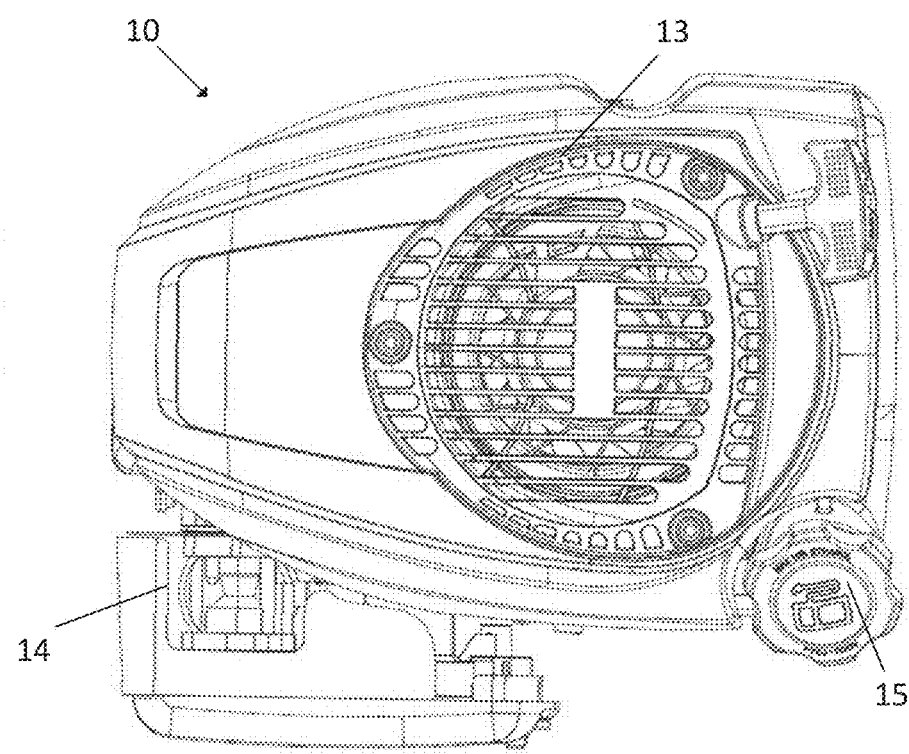
FIG. 1B illustrates a top view of the engine of FIG. 1A.

FIGS. 1A and 1B illustrates an engine 10. The engine 10 includes various components including a carburetor 11, a fuel tank 15, a recoil starter 13, and an air filter compartment 14. Additional, different or fewer components may be included.

Figure 2:
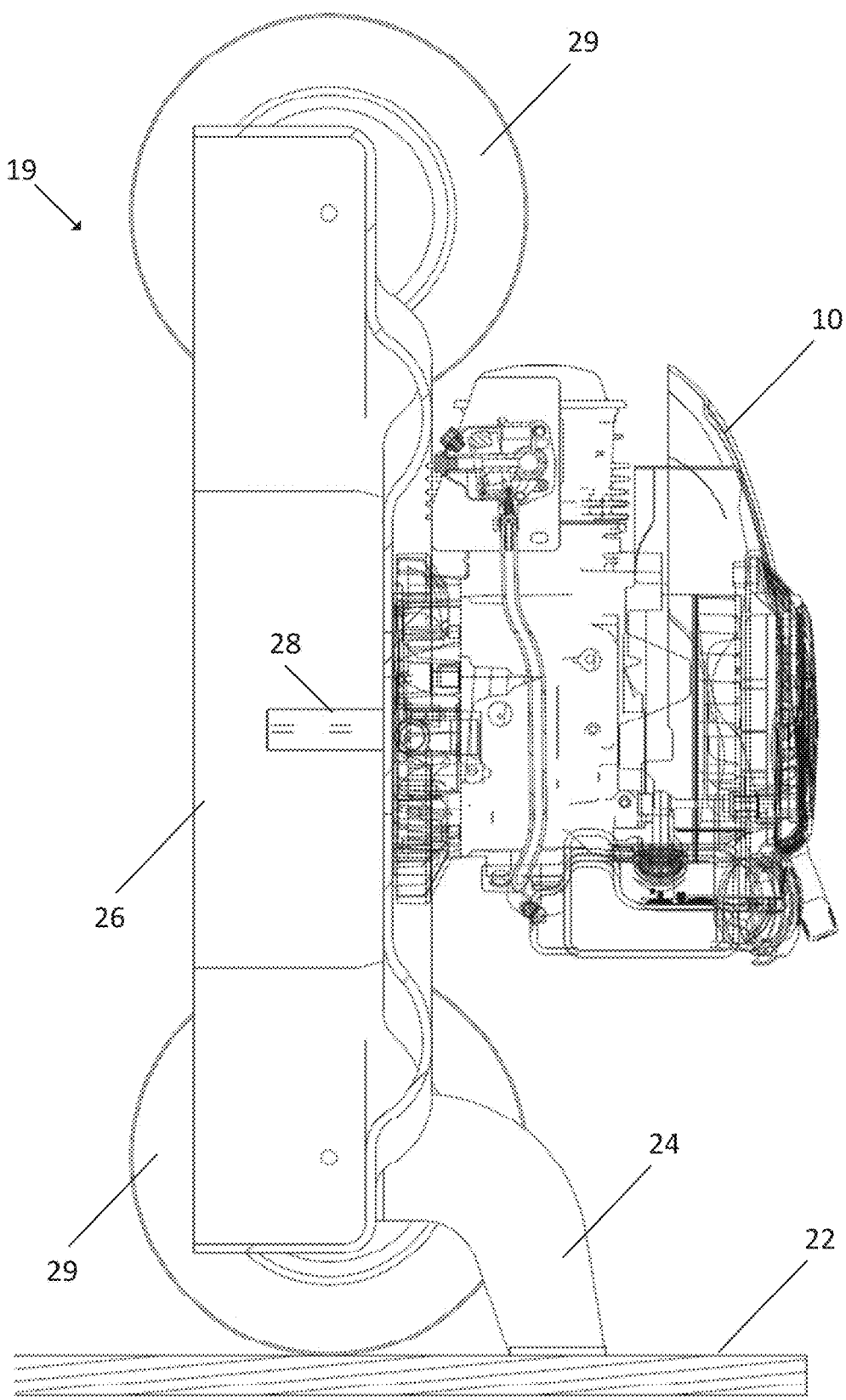
FIG. 2 illustrates the engine mounted on a rotary lawnmower.

FIG. 2 illustrates the engine 10 mounted on a rotary lawnmower 19 and a cross section of the fuel system where the carburetor fuel inlet valve is open to allow fuel to drain from the bowl to the fuel tank. A drive shaft 28 of the engine 10 may be coupled with a blade adapted to rotate under the force of the engine 10 and cut grass or other vegetation. The rotary lawnmower is in a tipped-up or storage orientation such that the lawnmower 19 is tipped on one end. The tipped-up or storage orientation places the wheels 29 of the lawnmower in a vertical orientation (e.g., front wheels are vertically spaced from the rear wheels) as opposed to a horizontal orientation (e.g., front wheels are horizontally spaced from the rear wheels) when the lawnmower 19 is in operation. In the tipped-up or storage orientation, a support portion 24 (e.g., supporting device) of the lawnmower 19 rests on, or is supported by, floor or ground 22. The support portion 24 may be coupled to or integrated with the handlebar or handles for pushing the lawnmower 19.

Figure 3A:
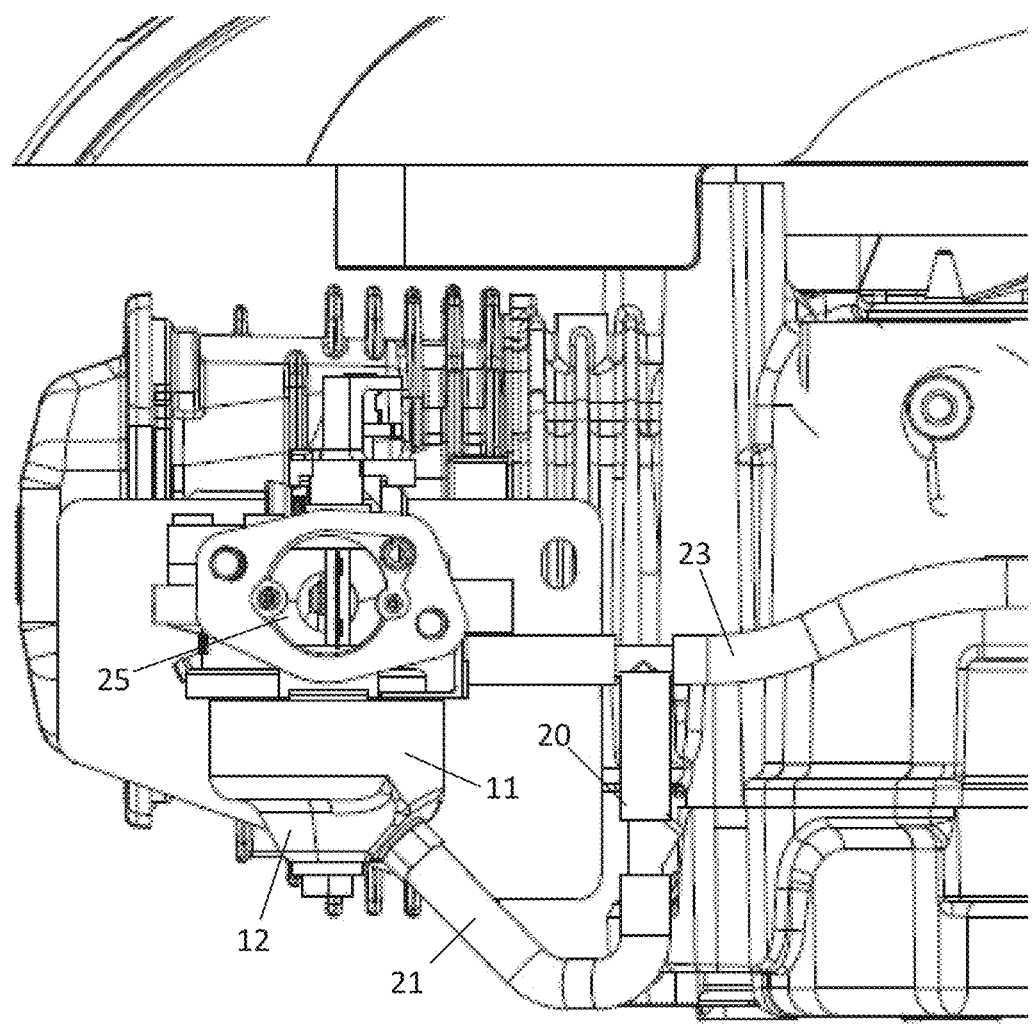
FIG. 3A illustrates an example carburetor for a running state.

FIG. 3A illustrates an example carburetor 11 including an air passage 25, a carburetor bowl 12, a fuel supply line 23, a carburetor drain line 21 and a valve 20. The valve 20 is coupled to the carburetor drain line 21. Additional, different or fewer components may be included.

The air passage 25 is a pipe that receives a flow of air and mixes fuel from a fuel pipe with the air to supply the fuel and air mixture to the engine 10. The air passage 25 may include a narrow portion (e.g., a venturi), which increases the speed of the flow of the air and creates a vacuum (e.g., partial vacuum) or pressure that pulls fuel into the flow of air to create the fuel and air mixture. The ratio of air to fuel may be adjusted by an upstream air flow valve (e.g., choke plate) in the air passage upstream in the direction of air flow from the fuel pipe. When the upstream air flow valve is more in a closed position, less air flow is present in the air passage 25 and/or relatively more fuel is pulled in by the low pressure, which causes a lower ratio of air to fuel (e.g., richer fuel and air mixture). When the upstream air flow valve is more in a closed position, less air flow is present in the air passage 25 and/or relatively more fuel is pulled in by the low pressure, which causes a lower ratio of air to fuel (e.g., richer fuel and air mixture). When the upstream air flow valve is more in an open position, more air flow is present in the air passage 25 and/or relatively less fuel is pulled in by the low pressure, which causes a higher ratio of air to fuel (e.g., leaner fuel and air mixture).

The ratio of air to fuel may be adjusted by a downstream air flow valve (e.g., throttle plate) in the air passage downstream in the direction of air flow from the fuel pipe. As the downstream air flow valve is more in an open position, more air flows through the air passage 25, picking up more fuel, and a larger volume of fuel and air mixture is provided to the engine 10.

The fuel pipe of the carburetor 11 connects the air passage 25 to the carburetor bowl 12. The carburetor bowl 12 is connected to a fuel supply line 23 that is connected to and receives a supply of fuel from a fuel tank. The carburetor bowl 12 may be a float feed chamber that includes a float and valve. The float is connected to the valve. The float has a density less than the fuel. As the fuel level in the carburetor bowl 12 sinks, from supply fuel to the fuel pipe and ultimately the engine 10, the float moves and actuates the valve (e.g., open the valve) with the fuel supply line 25. When the valve is actuated, more fuel flows from the fuel supply line 25 to the carburetor bowl 12. As the carburetor bowl 12 fills, or is full, the float rises, closes the valve, and the supply of fuel to the carburetor bowl 12 switches off again.

The carburetor 11 also includes a secondary fuel line (e.g., carburetor drain line 21) and a secondary valve (e.g., valve 20). The carburetor drain line 21 and valve 20 are configured to drain fuel from the carburetor bowl 12. The carburetor drain line 21 and valve 20 may drain the carburetor bowl 12 when the engine 10 is not in a running state. The carburetor drain line 21 and valve 20 may drain stale fuel or non-combustible fuel from the carburetor bowl 12. The carburetor drain line 21 and valve 20 may drain the carburetor bowl 12 when the engine 10 is in a predetermined orientation. The orientation may be an orientation other than upright. The orientation may be a storage orientation or a tipped-up orientation (e.g., for lawnmower 19).

The stale or non-combustible fuel may have a volatility below a threshold value. The volatility of the fuel may be measured in reed vapor pressure or an absolute vapor pressure of a chamber including the fuel that has not be evacuated. The volatility of the fuel may be inversely related to the Reid vapor pressure. The absolute vapor pressure increases due to factors such as time and heat. Starting an engine is more difficult as the absolute vapor pressure increases.

Figure 4A:
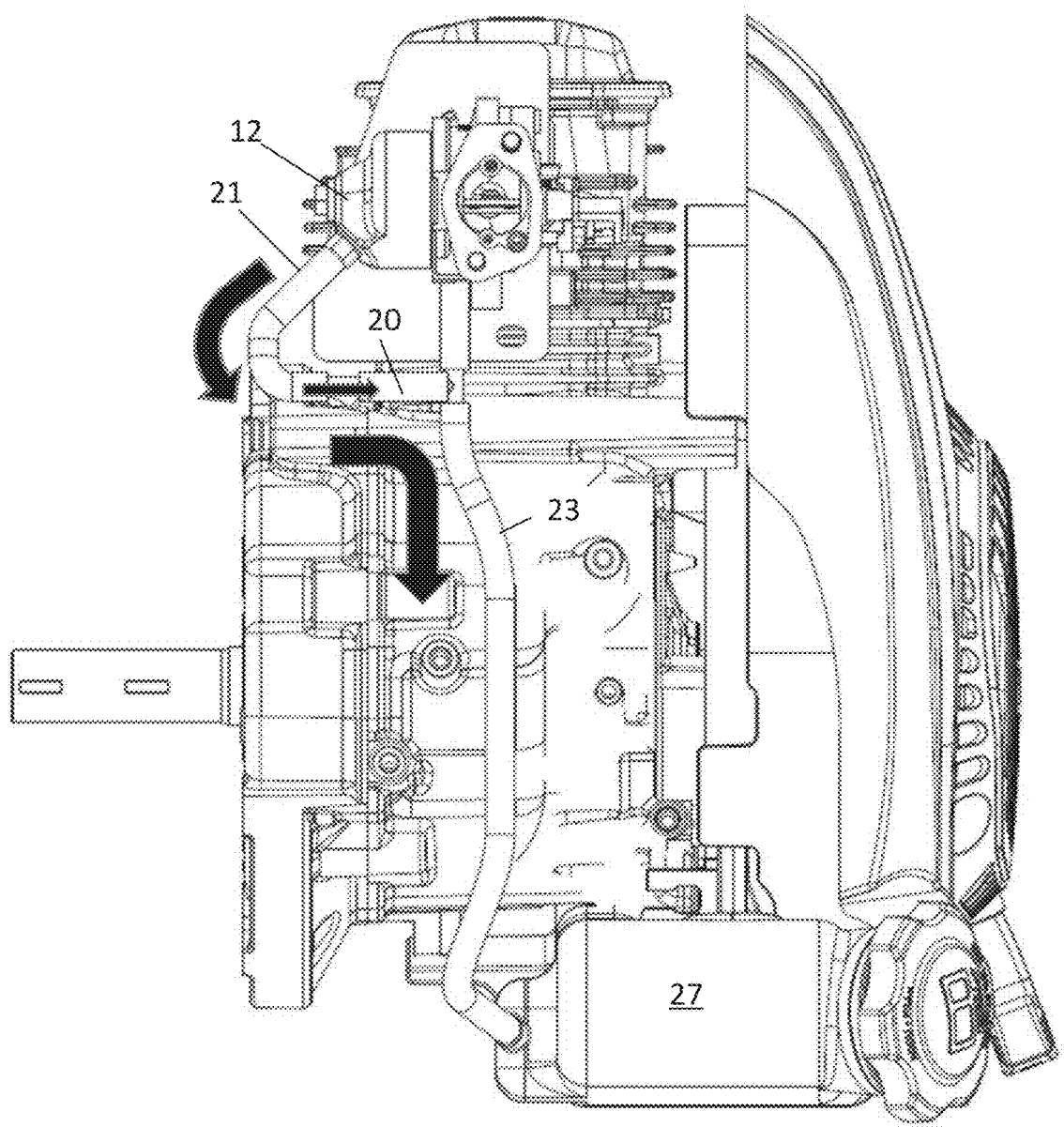
FIG. 4A illustrates an example carburetor for a tipped up state.

FIG. 3A illustrates an example carburetor in an operating orientation. FIG. 4A illustrates the example carburetor in a tipped-up or storage orientation.

A storage orientation or a tipped-up orientation may occur when an apparatus including the engine 10 is stored in a different orientation than when in use or in operation with the engine 10 is running. In one example, the storage orientation is vertical and the operation orientation is horizontal. In the example of a lawnmower, more than two wheels (e.g., three or four wheels) may rest on the ground in the operation orientation and two or fewer wheels may rest on the ground in the storage orientation. The lawnmower may include a third point of support (or more) from an additional stand. The additional stand may mate with the lawnmower and a supporting device integrated with the lawnmower. The additional stand may be rotatable about one or more of the wheels. The storage orientation may have a smaller footprint than the operation orientation. For example, the space in a horizontal plane (e.g., the plane perpendicular to the direction of gravity) required by the apparatus in the storage orientation is less than the space in the horizontal plane required by the apparatus is the operation orientation. Examples other than lawnmower include all terrain vehicles, golf carts, garden equipment or other wheel supported devices with small engines.

Figure 3B:
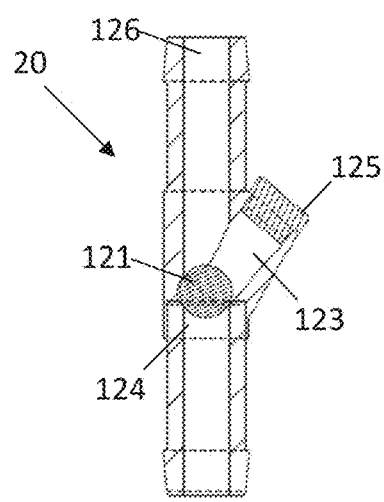
FIG. 3B illustrates an example valve for the carburetor of FIG. 3A.

FIG. 3B illustrates an example valve 20. The valve 20 may include a check ball 121, a pocket or passage 123, and a plug 125. The valve 20 may be a check valve adapted to permit flow in one direction and not the other direction. For example, the valve may permit flow away from the carbonator bowl 12 and not toward the carburetor bowl 12. Additional, different, or fewer components may be included, and a variety of check valves or other types of valves may be used in place of the valve shown in FIG. 3B.

The valve 20 uses gravity to move the check ball 121 on a sealing surface or seat 124 from a position to stop flow in one direction as in FIG. 3B, to a position, typically 90 degrees from the stop flow direction, where gravity causes the check ball to move into a pocket or passage 123 outside of the main flow passage 126 to allow fluid to flow. A plug 125 has a semi-spherical surface to locate the ball in the flow position. The plug 125 provides a method to form the sealing seat 124 in the valve body 20.

In one example alternative to the check valve illustrated in FIG. 3B, a swinging gate type check valves may perform a similar function. The swinging gate may include a hinge that allows a gate to open and close in the direction of the flow.

The valve 20 may be a gravity controlled check valve (e.g., gravity sensing device) that allows flow in one direction only in a particular orientation with respect to gravity. The valve 20 may operate or be actuated in response to gravity. When the valve 20 (and carburetor 11) is in a first orientation, the valve 20 is in a first state (e.g., open state), and when the valve 20 (and carburetor 11) is in a second orientation, the valve 20 is in a second state (e.g., closed state). When the apparatus is in the storage orientation, the valve 20 may be in the open state, and when the apparatus is in the operation orientation, the valve 20 may be in the closed state. A gravity sensing device such as the check valve in FIG. 3B may be the most cost effective and efficient option as compared to other types of valves.

Figure 4B:
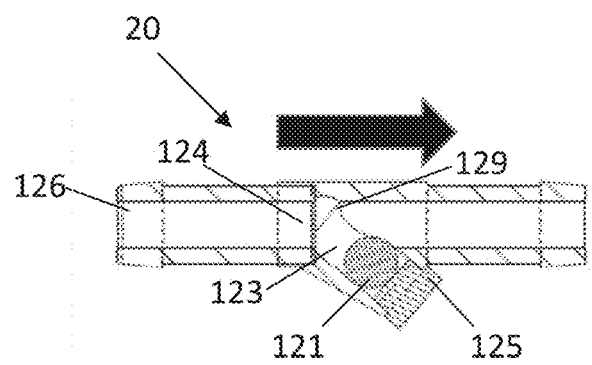
FIG. 4B illustrates an example valve for the carburetor of FIG. 4A.

In the open state, as shown by FIG. 4A, the valve 20, as illustrated in more detail in FIG. 4B, may connect the drain line 21 to the fuel supply line 23. The illustrated valve uses gravity to move the check ball 121 on a sealing surface or seat 124 from a position to stop flow in one direction as in FIG. 3B, to a position, approximately 90 degrees from the stop flow direction, where gravity causes the check ball to move into a pocket or passage 123 outside of the main flow passage 126 to allow fluid to flow. A plug 125 has a semi-spherical surface to locate the ball in the flow position. The plug 125 provides a method to form the sealing seat 124 in the valve body 20.

Through the operation of the valve 20, fuel from the carburetor bowl 12 is returned to the fuel supply line 23 through the valve 20. Some of the fuel from the carburetor bowl 12 may return to the fuel tank 27. When fuel is returned to the fuel supply line 23, in a subsequent operation of the engine 10 where the engine is oriented in the operating position, any potential stale fuel will be mixed with, or diluted by, fresh fuel in the fuel supply line 23. When fuel is returned to the fuel tank 27, in a subsequent storage orientation of the engine 10, any potential stale fuel will be mixed with, or diluted by, fresh fuel in the fuel tank 27. Therefore, through the operation of valve 20 connecting the drain line 23 to the fuel supply line 23, fuel that would normally or typically remain in the carburetor bowl 12 over time and risk becoming less volatile is now automatically drained. That is, the carburetor bowl 12 is automatically drained and replenished to increase the volatility of the fuel in the carburetor bowl 12.

Figure 5A:
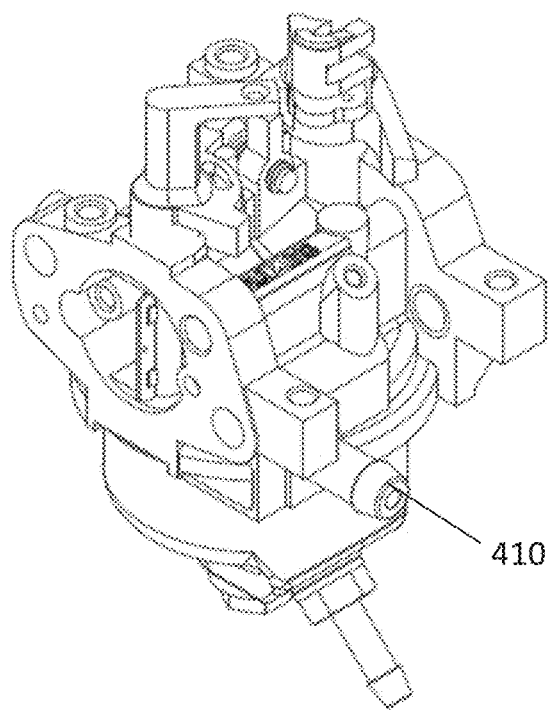
FIGS. 5A and 5B illustrate another example carburetor.
Figure 5B:
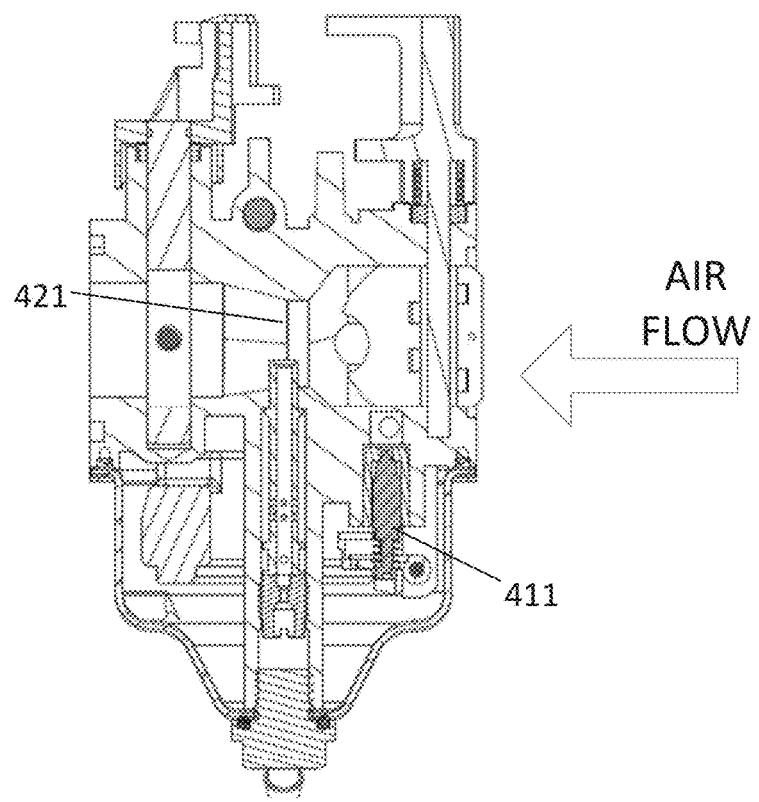

FIGS. 5A and 5B illustrate an example carburetor. A fuel inlet nipple 410 provides fuel to carburetor bowl. A needle 411 has a tapered diameter to meter the amount of fuel released into the air passage. FIGS. 5A and 5B include a location of the fuel inlet valve that will not allow fuel to fully drain from bowl in the tipped up state. FIG. 5B also illustrates the main air flow through the carburetor that passes through a venturi passage 421 having a smaller cross sectional area that reduces the air pressure in the flow to draw fuel into the main chamber for mixture with the air flow.

Figure 6:
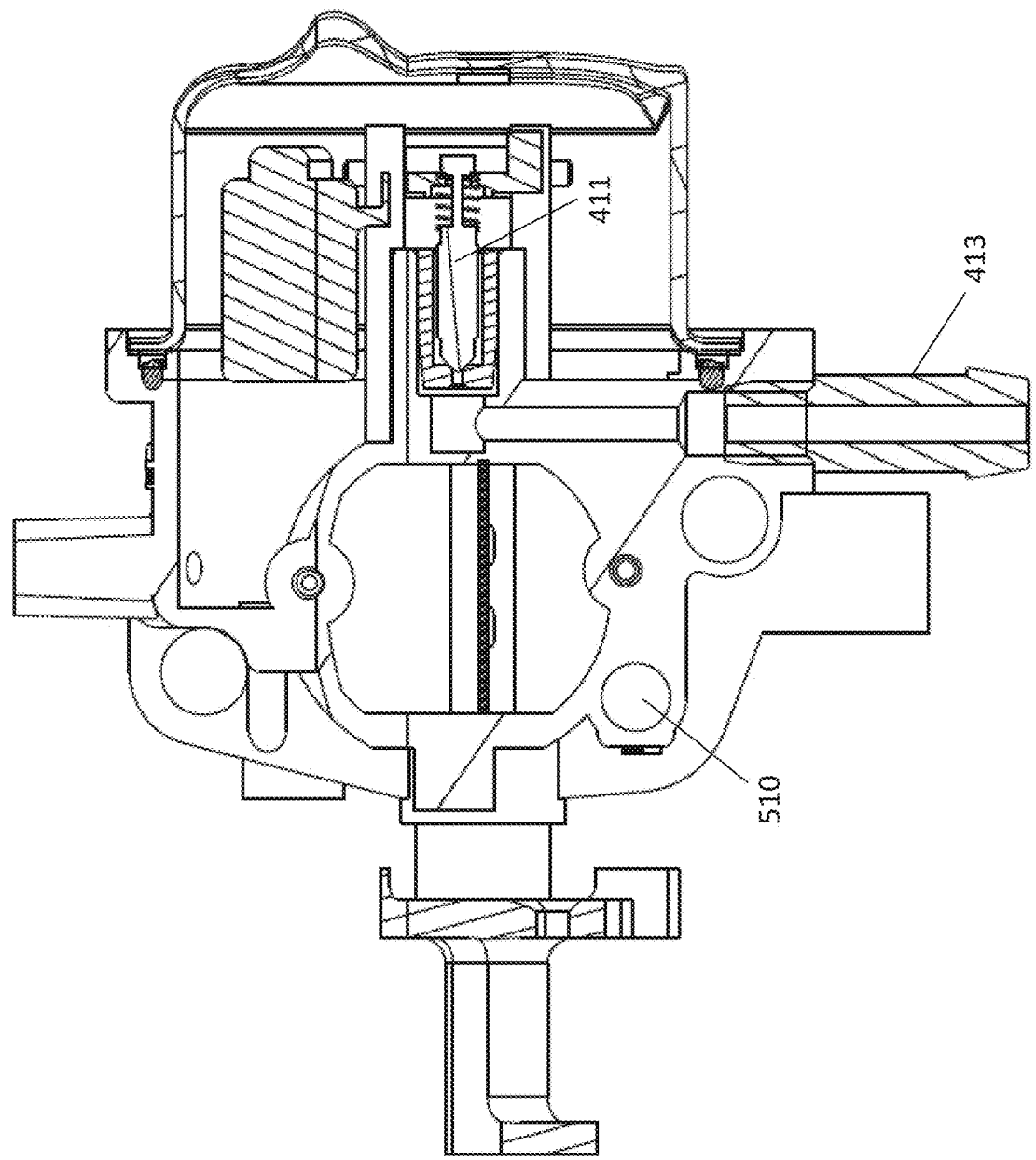
FIG. 6 illustrates a cross section of the carburetor in a non-draining position.

FIG. 6 illustrates a cross section of the carburetor including the location of the fuel inlet needle when tilted. Fuel in the carburetor bowl cannot drain via the inlet needle. Some fuel will drain out the bowl vent 510 passage and spill outside the engine. FIG. 6 illustrates a cross section that shows the fuel inlet valve in a position where fuel will not fully drain from the bowl of the carburetor.

Figure 7:
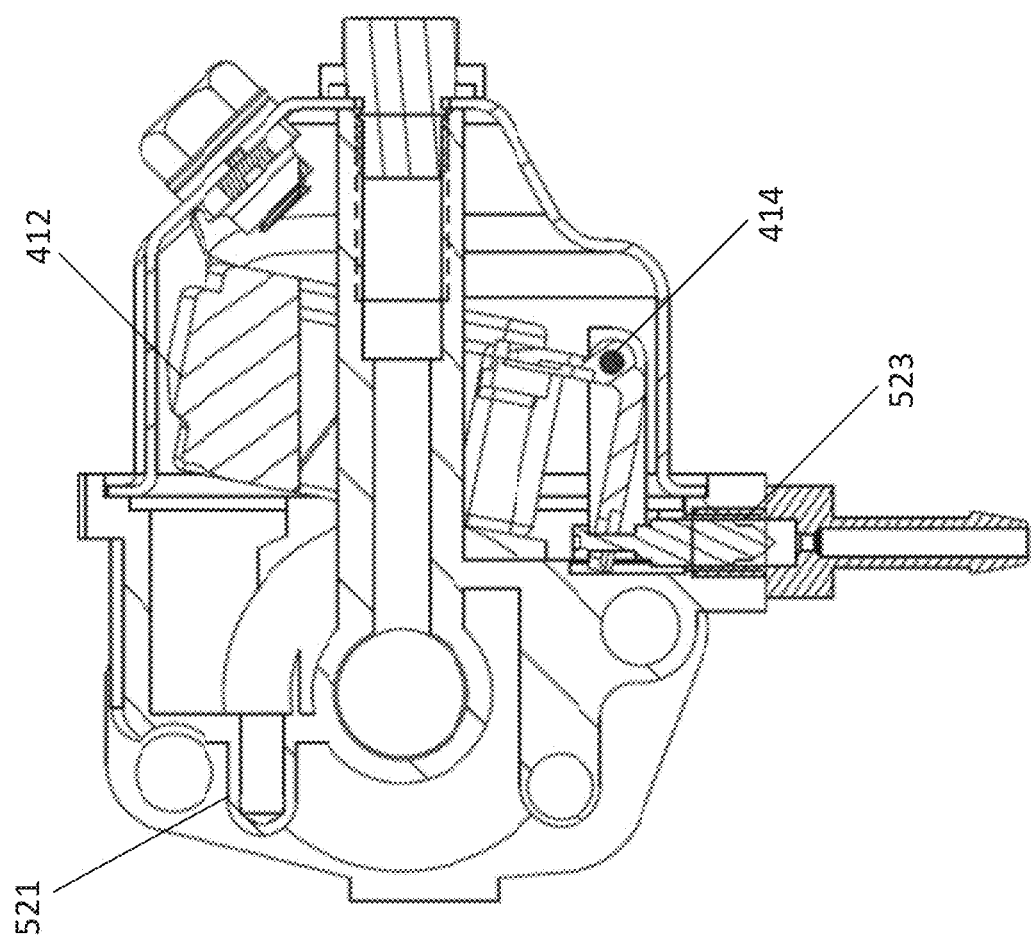
FIG. 7 illustrates a cross section of the carburetor and tilted engine in a draining position.

FIG. 7 illustrates a cross section of the carburetor including the fuel inlet needle located at low point when engine is tilted to allow fuel to drain back to the fuel tank. Bowl vent 521 located to prevent fuel from draining uncontrolled from the bowl.

FIG. 6 illustrates an example carburetor with the float is hinged perpendicular to the tilted angle so that movement is minimally affected by gravity to move it to a position to open the fuel inlet needle 411. FIG. 7 illustrates the carburetor in which the float hinge orientation promotes the movement of the float due to the carburetor tilt angle. A rotated float mechanism with the fuel inlet valve configured to allow all of the fuel to drain from the bowl when tilted. FIG. 6 illustrates the carburetor in a normal or operation orientation with the axis of the nipple 413 in the horizontal plane (e.g., perpendicular to gravity) or within a predetermined angle to the horizontal plane. FIG. 7 illustrates the carburetor in a titled orientation with the axis of the nipple 413 in the vertical plane (e.g., parallel to gravity) or with a predetermined angle to the vertical plane or greater than a predetermined angle from the horizontal place.

In FIGS. 6 and 7, the fuel inlet needle 411 is reoriented from a typical carburetor to a position where when the carburetor is tilted, the inlet needle is at the lowest point of the fuel reservoir. This allows all of the fuel to drain back to the fuel tank through drain line 413. In the normal inlet needle location, an amount of fuel can be trapped. This trapped fuel would eventually create gummy deposits as it evaporates.

When the carburetor is rotated from the normal rotation in FIG. 6 to the tilted orientation in FIG. 7, the fuel tank 412 rotated relative to the carburetor. The fuel tank 412 is supported by a pivot 414, which may include a rotatable connection with the carburetor housing.

The fuel tank 412 rotates according to the center of buoyancy of the fuel tank. The center of buoyancy is analogous to the center of mass of a volume, e.g., the center of buoyancy of a sphere is the center of the sphere. A rigid link attached to the sphere and secure the other end of the link to the edge of a vessel of fluid with a hinge, the sphere would rotate about the hinge relative to the fluid level. If the sphere is fully submerged, the sphere would be directly above the hinge. In the embodiments of FIGS. 6 and 7, the float unseats the fuel inlet needle when the carburetor is tilted by two factors. One factor is offsetting the center of buoyancy to begin the rotation of the float away from the inlet needle closed position when the carburetor bowl is full. The other factor is the effect of gravity to keep the float rotated to the inlet needle open position when the fuel is drained past the point where the float will float.

Figure 8A:
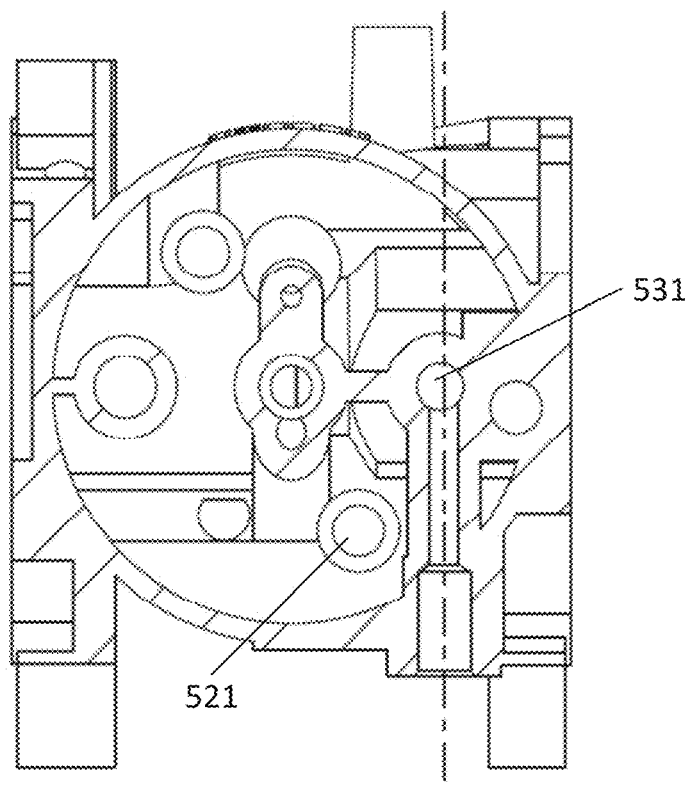
FIGS. 8A and 8B illustrate bowl vent locations in the carburetor.
Figure 8B:
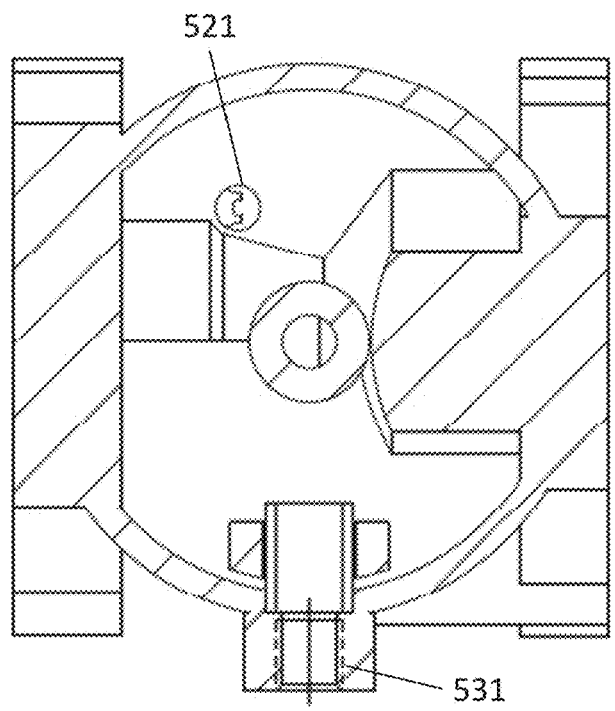

FIGS. 8A and 8B illustrate bowl vent locations in the carburetor. FIG. 8A includes a cross section showing location of the fuel inlet needle 531 when tilted. Fuel in bowl cannot drain via the inlet needle. Some fuel will drain out the bowl vent 521 and spill outside the engine.

FIG. 8B the fuel inlet needle located at low point when engine is tilted to allow fuel to drain back to the fuel tank. Bowl vent located above the fuel level when the carburetor is tilted to prevent fuel from draining uncontrolled from the bowl.

Figure 9A:
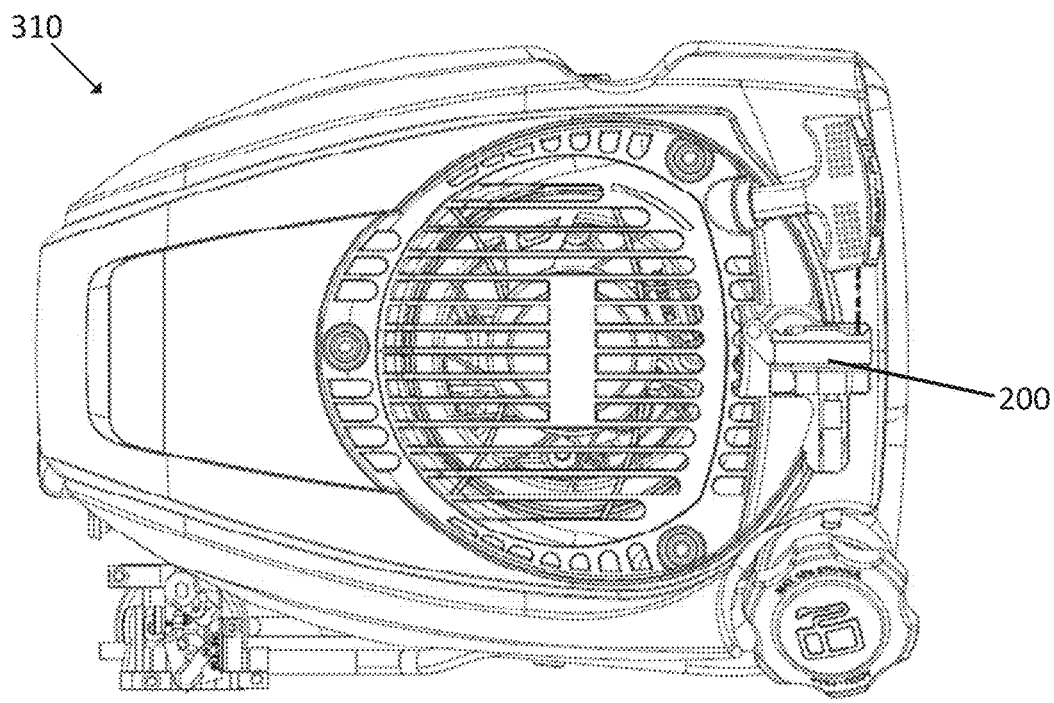
FIG. 9A illustrates a top view of an engine including a recoil pump.
Figure 9B:
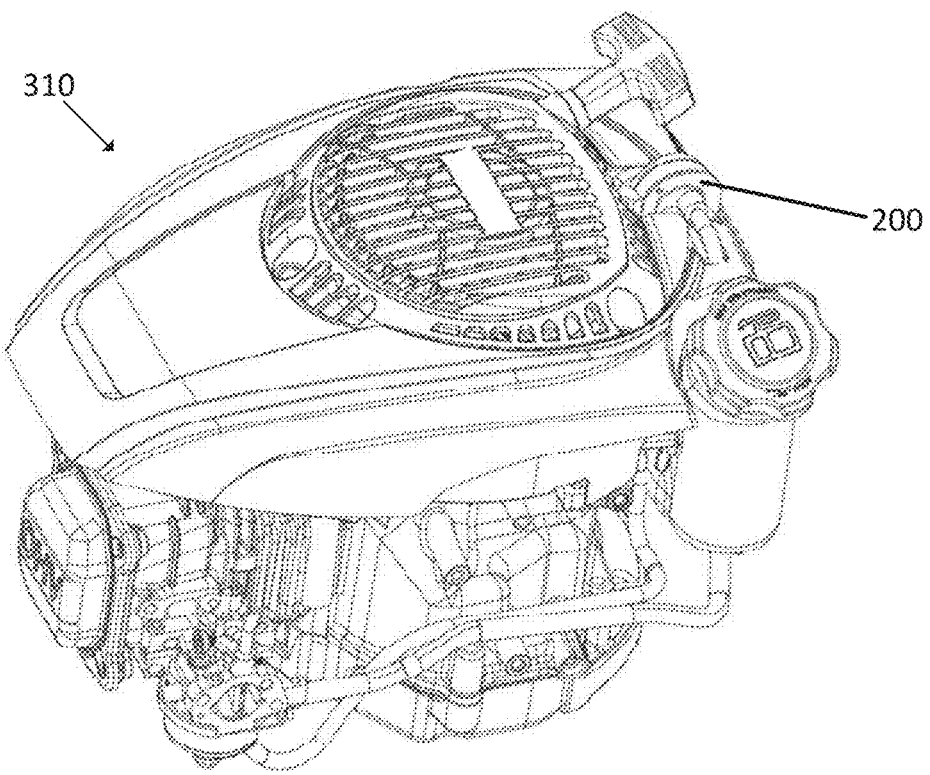
FIG. 9B illustrates a three-dimensional view of the engine including the recoil pump.

Another technique for removing fuel from a carburetor bowl includes a reciprocating pump (e.g., mechanically actuated diaphragm pump), actuated by a recoil starting device, for flushing or draining the carburetor bowl. Other examples may include a piston pump, peristaltic pump that is actuated by the recoil starter, a rotating element pump which may be a gear, gerotor, or vane type, or a reciprocating pump powered by an electric starter. FIG. 9A illustrates a top view of an engine 310 including a recoil pump 200, and FIG. 9B illustrates a three-dimensional view of the engine 310 including the recoil pump 200.

In one alternative (not illustrated) to the recoil pump 200 and recoil starting device, or actuation powered by the recoil starting device, a pump may be powered by an electric starter to provide the draining function for the carburetor bowl. When the electric starter is energized, the pumping function begins. When the engine starts, and the starter returns to a de-energized state, the pumping function ceases. The action of a starter pinion gear, extending from its rest position may drive a reciprocating type pump for draining the carburetor bowl.

Figure 10:
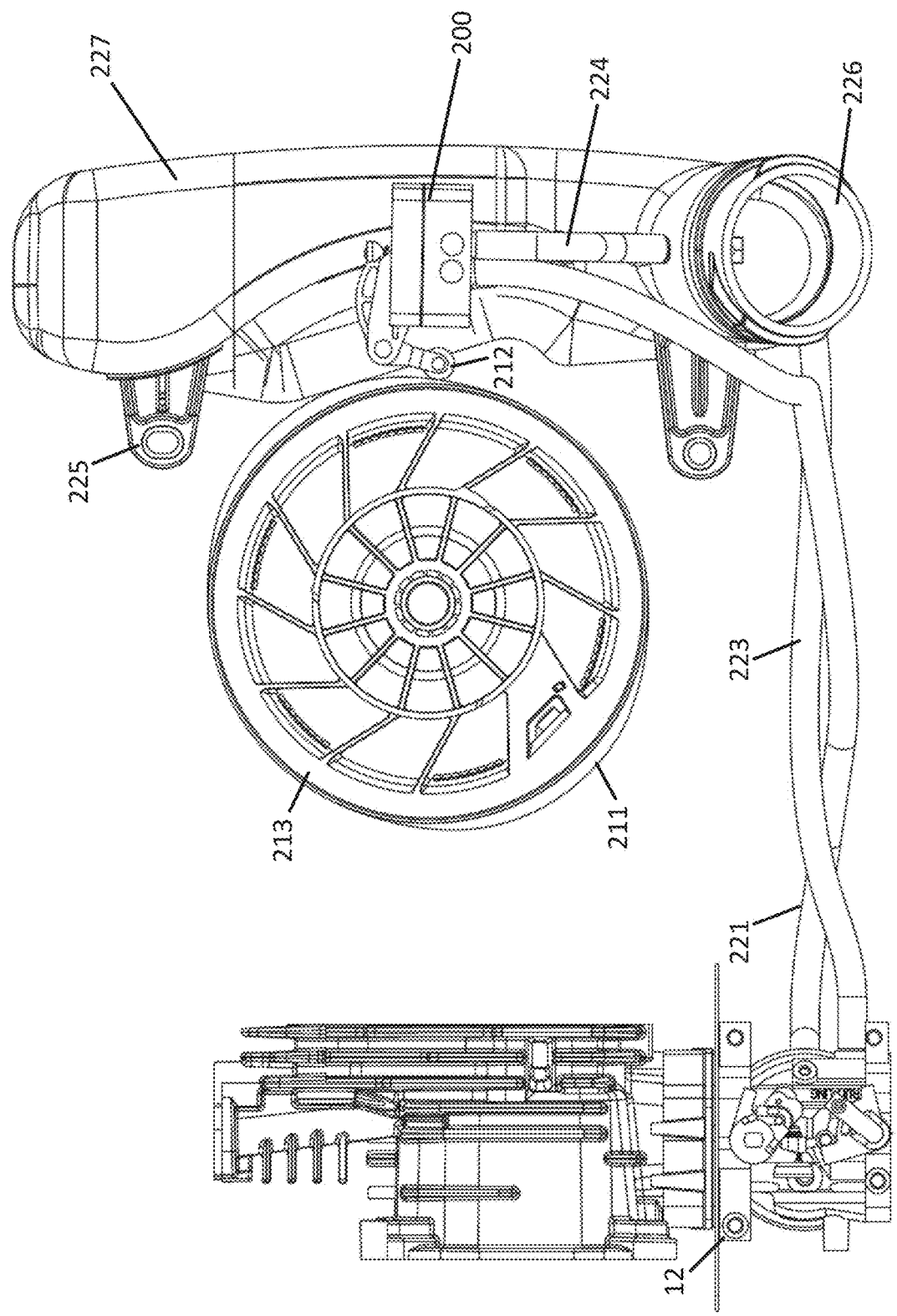
FIG. 10 illustrates a blower housing mounted fuel recirculation system.
Figure 11A:
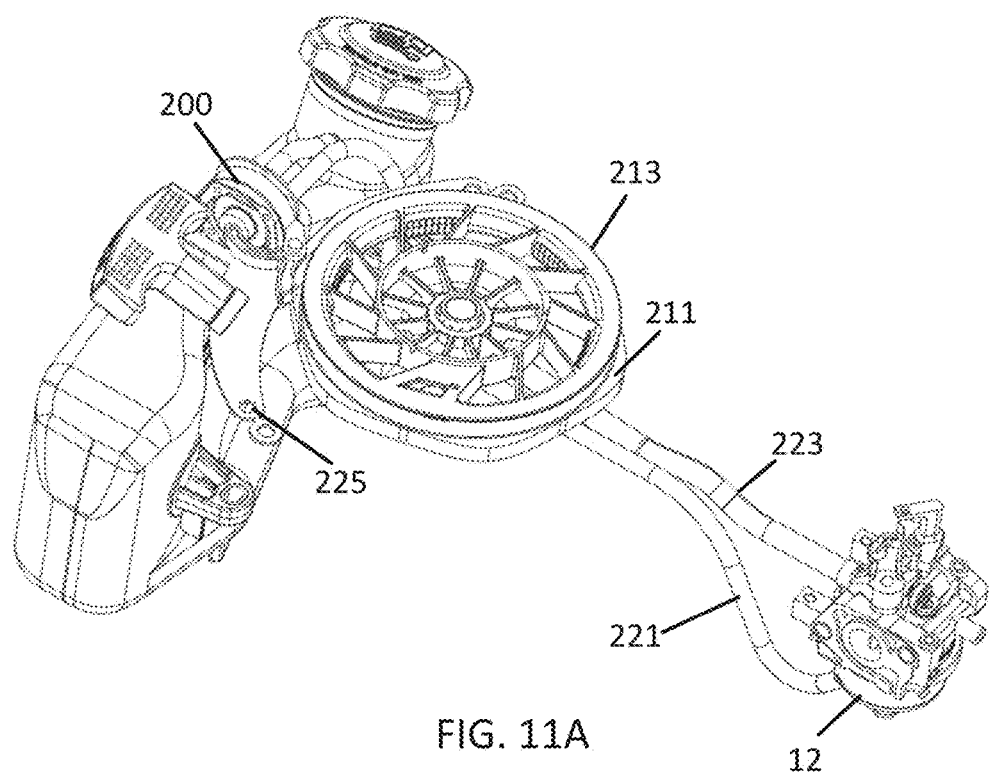
FIGS. 11A and 11B illustrates three-dimensional views of the blower housing mounted fuel recirculation system of FIG. 10.
Figure 11B:
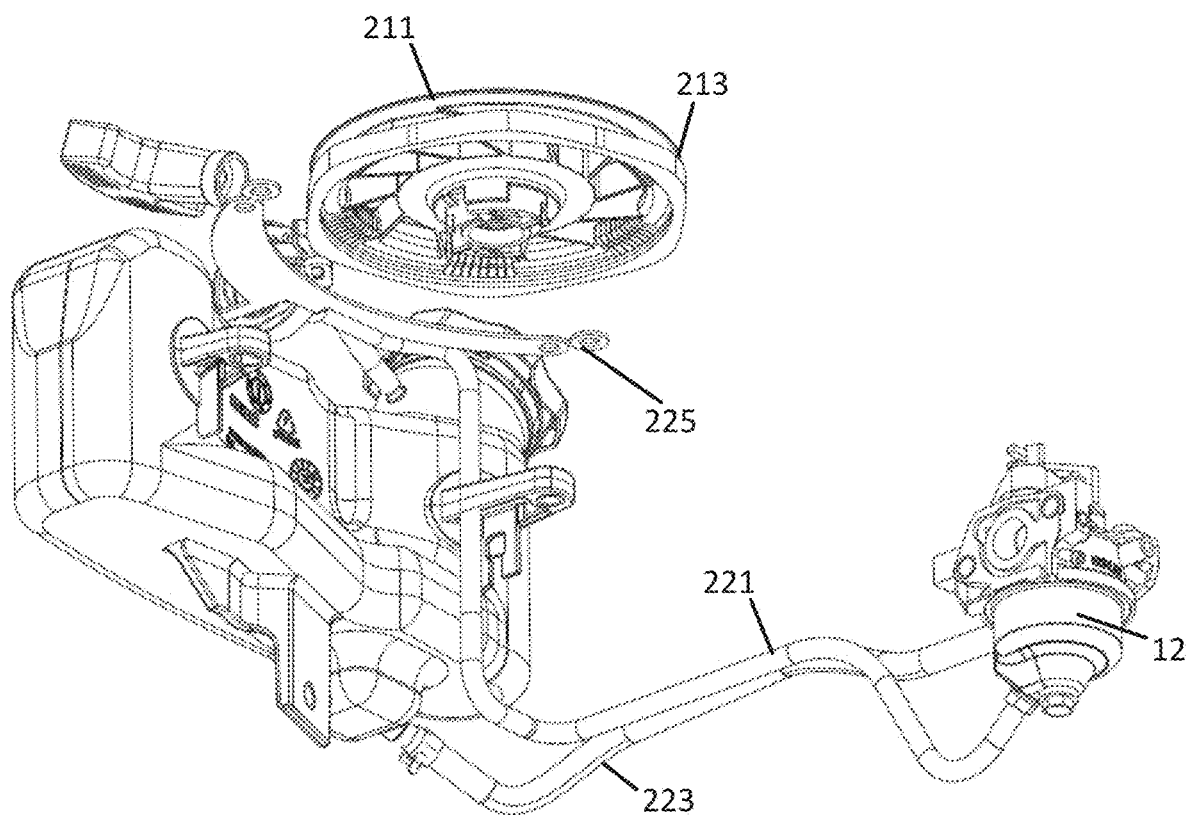

FIG. 10 illustrates a blower housing mounted fuel recirculation system including a recoil pump 200 or a recoil starter mounted pump 200. FIGS. 11A and 11B illustrate three-dimensional views of the blower housing mounted to a similar fuel recirculation system.

The recoil pump 200 may be used in combination with the valve 20 or as an alternative to the valve 20. The recoil pump 200 may pump fuel from the carburetor bowl 12 through a drain line 221 to the recoil pump 200 and through a return line 224 from the recoil pump 200 to the fuel tank, which is illustrated behind fuel cap connection opening 226. The recoil pump 200 may be actuated by the starter recoil pulley 213. The starter recoil pulley 213 may include one or more protrusions 211 that come in contact with the recoil pump 200. The protrusions 211 may be lobes or cams. The protrusions 211 may take various other shapes. Two protrusions are illustrated in FIG. 10, and a system with five protrusions are illustrated in FIGS. 11A and 11B. Any number of protrusions may be used.

As described above, the fuel in the carburetor bowl 12, provided from a fuel line 223 from the fuel tank, may become stale over time. When the engine 10 is subsequently started, by pulling the starter handle 277 (starter rope not shown), the starter recoil pulley 213 rotates and one or more of the protrusions 211 are brought into contact and out of contact with the recoil pump 200. The actuation of the recoil pump 200 pulls the stale fuel from the carburetor bowl 12 through the drain line 221. Fresh fuel flows through the fuel line from the fuel tank into the carburetor bowl to provide a better starting air fuel mixture to the engine.

Figure 12A:
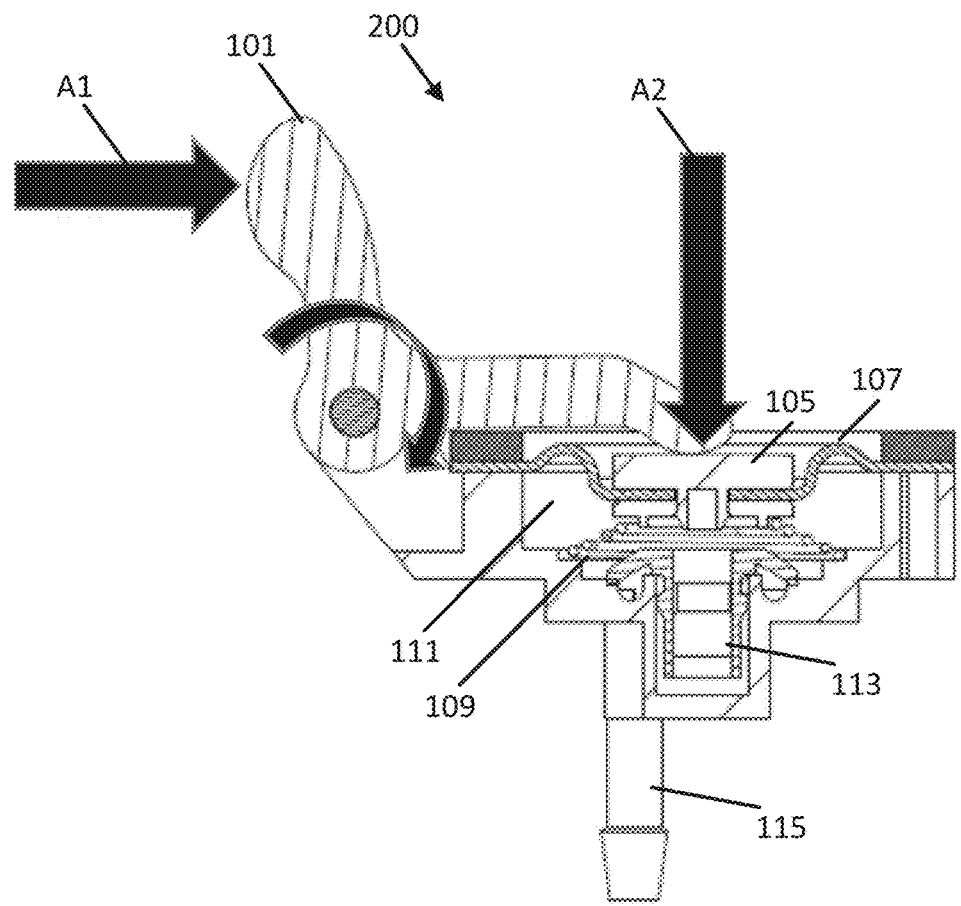
FIG. 12A illustrates a deactivated position of the recoil pump at the end of the discharge stroke.
Figure 12B:
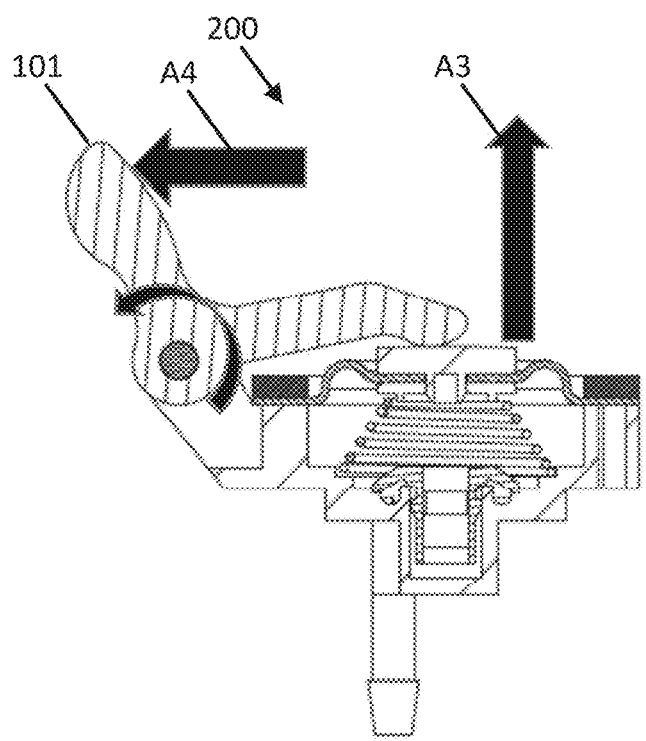
FIG. 12B illustrates an activated position of the recoil pump at the end of the section stroke.

FIG. 12A illustrates fully discharged position of the recoil pump 200. FIG. 12B illustrates end of suction stroke position of the recoil pump 200.

The recoil pump 200 may include a cam follower arm 101, a hard point assembly 105, a diaphragm 107, a conical spring 109 in a pump chamber 111, a check valve 113, an outlet pipe 115 to the fuel tank or a fuel supply line, and an inlet pipe 117 (not shown in FIGS. 12A and 12B) from the carburetor bowl. In one example, an intermediate cantilevered lever is between the cam follower arm 101 and the hard point assembly 105. Additional, different, or fewer components may be included.

The cam follower arm 101 may be in contact with one or more protrusions 311 on the starter recoil 313. As the starter recoil 313 rotates, a protrusion 311 is brought in contact with the cam follower arm 101, under a displacement force illustrated by arrow A1, which presses the cam follower arm 101 from a deactivated state (e.g., suction phase) illustrated by FIG. 12B to the activated state (e.g., discharge phase) illustrated by FIG. 12A.

When depressed, the cam follower arm 101 applies a level force illustrated by arrow A2 either to intermediate cantilevered lever when included, or directly to the hard point assembly 105 when the intermediate cantilevered lever is not included. The intermediate cantilevered lever, when included, provides stabilization to the assembly.

The hard point assembly 105 receives the force from the cam follower arm 101 or from the intermediate cantilevered lever. The hard point assembly 105 is connected to the diaphragm 107 and the conical spring 109. The hard point assembly 105 spreads the force from the cam follower arm to the diaphragm 107 across the pump chamber 111 to spread the force of evenly to depress the diaphragm 107 and the conical spring 109.

The conical spring 109 is adjacent to the check valve 113. The conical spring 109 compresses to reduce the size of the pump chamber 111 to force fuel through the check valve 113 through the outlet pipe 115 and decompresses or expands to increase the size of the pump chamber 111 to draw fuel from the inlet pipe 117. The fuel in the pump chamber 111 may enter the recoil pump 200 through an outer diameter compartment before flowing into the pump chamber 111. The conical spring 109 transitions from decompressed to compressed each time the cam follower arm 101 is operated by the protrusion 311.

The conical spring 109 may return to the decompressed state through energy stored in the conical spring 109 and apply a spring force as illustrated by arrow A3 to the cam follower arm 101. The cam follow arm 101 provides a lever force illustrated by arrow A4 to push the cam follower arm 101 against the protrusions 311 on the starter recoil 313.

The check valve 113 may include a duckbill valve having a center section shaped like a hull or a duck bill. Under pressure, the check valve 113 opens to allow flow of fuel through the check valve 113. The check valve 113 may be replaced by two ball and spring check valves, reed valves or other check valve devices.

The cam follower arm 101, which may be referred to as a rocker arm, provides leverage between the force received the protrusion 311 and the force applied to the conical spring 109. In other words, an applied distance by the protrusion 311, which may be the height of the protrusion 311, is less than a compression distance applied to the conical spring 109. The cam follower arm 101 may operate as a lever that translates a first distance of the protrusion 311 to a second distance of the conical spring 109, with the first distance being smaller than the second distance. The cam follower arm 101 provides more stroke to the pump with less of a lift from the recoil. In one example, the protrusion 311 as a depth of 1-3 millimeters and the distance that the conical spring 109 is depressed is 5-10 millimeters.

The protrusions 211 come into contact with the recoil pump 200 at the cam follower arm 101 in FIGS. 12A and 12B and, alternatively, at roller 213 shown in FIG. 10. The roller 213 and the cam surface of the cam follower arm 101 are interchangeable. The cam surface of the follower arm 101 may be referred to as a sliding piston. In some examples, the cam surface may be preferable to reduce the number of moving parts of the system. In some examples, the roller 213 may be preferable because the sliding piston creates friction and generates wear. In some scenarios, the force from the pump lever from the cam follower arm 101 may be greater than the spring return force in the recoil, which hampers or prevents the recoil from winding after a pull. The roller 213 may reduce this friction to allow the recoil to operate properly. In some examples, the roller 213 may be added to the cam follower arm 101. In this way, if the roller 213 becomes damaged and is removed or otherwise falls off, the cam surface of the cam follower arm 101 remains. The recoil starter is configured to simultaneously start the engine and actuate the pump. The term simultaneously may mean within a predetermined amount of time (e.g., 1-5 seconds) or as part of the same action (e.g., pulling the starter).

Figure 13A:
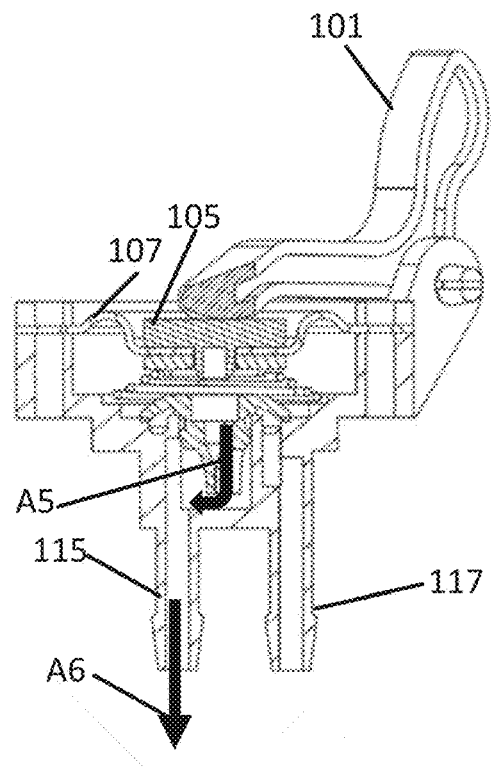
FIG. 13A illustrates the operation of the recoil pump in the discharge stroke.
Figure 13B:
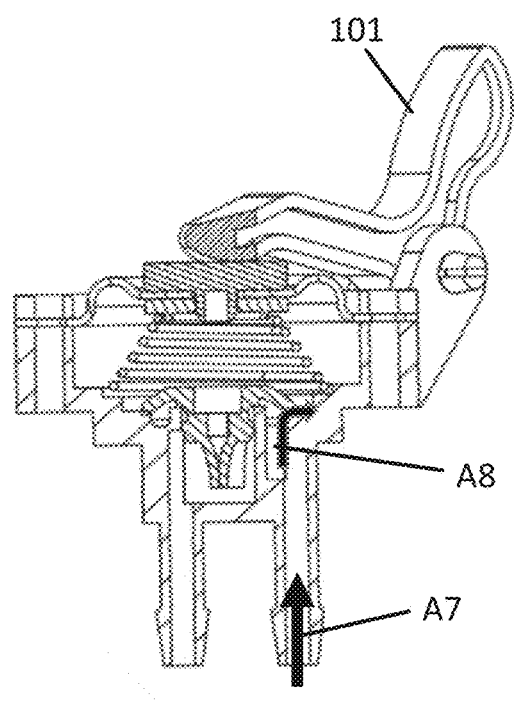
FIG. 13B illustrates the operation of the recoil pump in the suction stroke.

FIGS. 13A and 13B further illustrate the operation of the recoil pump. As shown by arrow A5, fuel under pressure flows through the duck bill. As shown by arrow A6, fuel is pushed out of the pump chamber through the outlet pipe 115. As the conical spring returns to the decompressed state, fuel is drawn into the inlet pipe 117, as shown by arrow A7, and into the pump chamber, as shown by arrow A8.

Figure 13C:
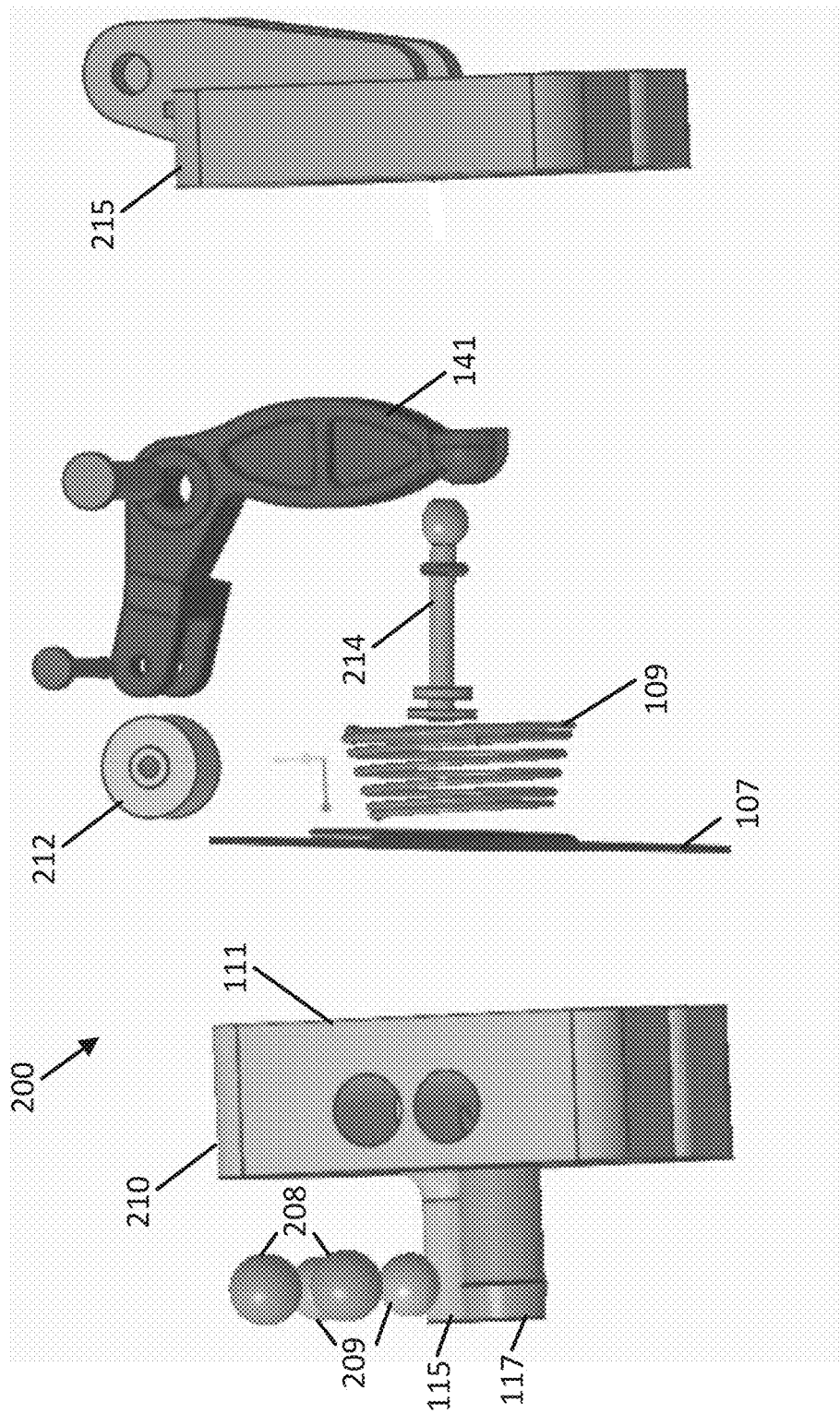
FIG. 13C illustrates an exploded view of a recoil pump.
Figure 13D:
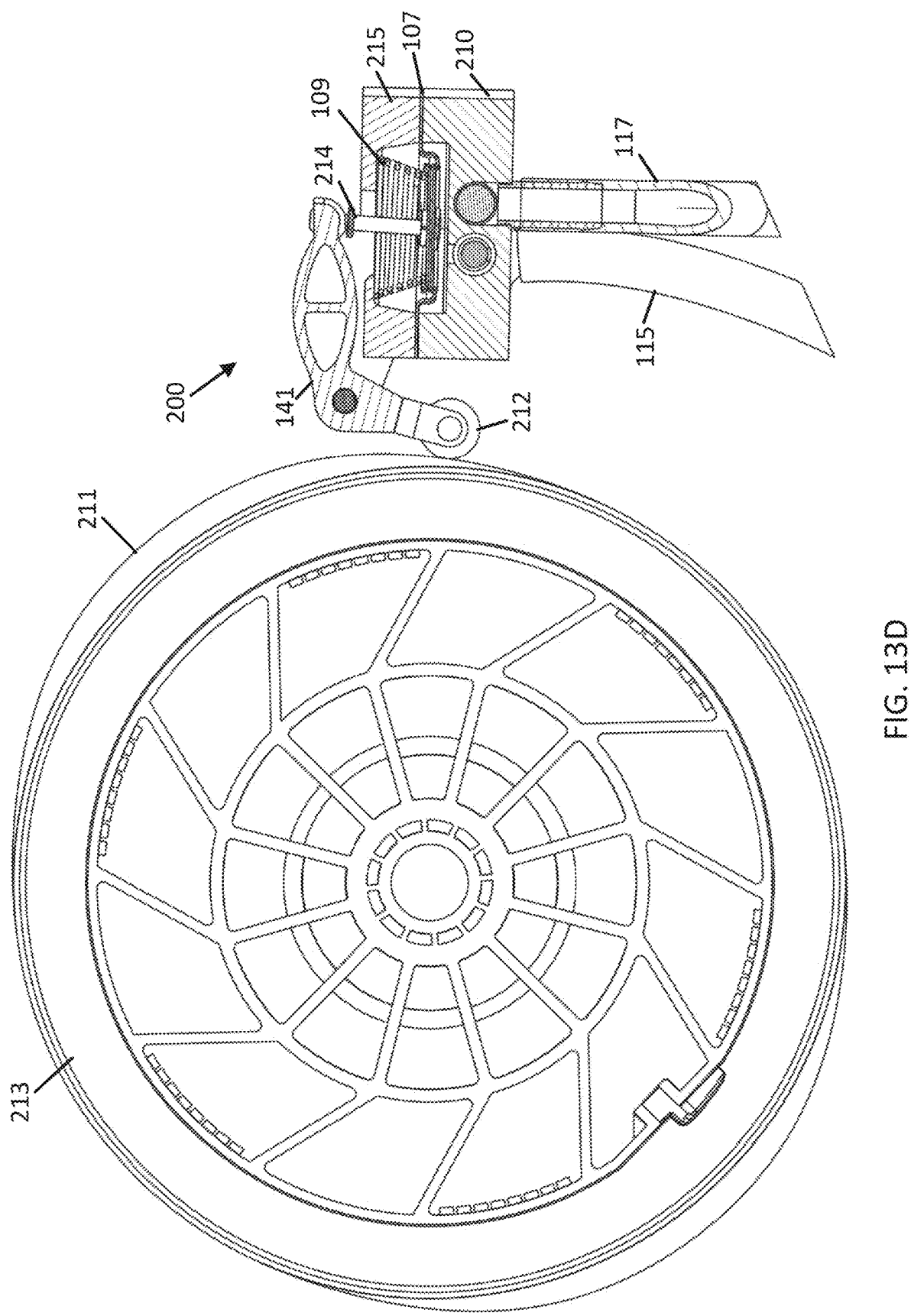
FIG. 13D illustrates a top view of the recoil pump of FIG. 13C and the blower housing.

FIG. 13C illustrates an exploded view of a recoil pump 200. The recoil pump 200 may include a follower arm 141, a diaphragm 107, a pull rod 214, a conical spring 109, and a support bracket 215. A pump chamber is formed between the valve assembly 210 and the diaphragm 107. The valve assembly 210 may include different types of valves, and the illustrated example includes plug balls 208 and check balls 209 for an outlet pipe 117 to the fuel tank or a fuel supply line and an inlet pipe 115. The plug balls 208 and check balls 209 may be formed from metal or steel. Other types of check valves or reed valves with a flap of material (e.g., rubber or Mylar). Additional, different, or fewer components may be included. FIG. 13D illustrates a top view of the recoil pump of FIG. 13C and the blower housing.

In the examples of FIGS. 13A and 13B, the cam follower arm 101 is actuated and to force fuel out of the chamber 111, and the energy stored in the spring 109 draws fuel into the chamber 111. In some examples, depending on the speed of the recoil and the number of protrusions, this arrangement may move too quickly to give time for the fuel to be drawn into and/or forced out of the chamber 111.

As an alternative, the example of FIGS. 13C and 13D the follower arm 141 is actuated by the movement of the roller 213 along the protrusions to draw fuel into the chamber 111, and the energy stored in the spring 109 forces the fuel out of the chamber 111. That is, the spring 109 is connected to the diaphragm 107 and biased to push the diaphragm 107 into the chamber 111, which pushes the fuel out of the chamber 111. The pull rod 214 is also connected to the diaphragm 107 on one end and to the follower arm 141 on the other end. As the follower arm 141 moves in response to the roller 212 rolling over the convex portion of the protrusion, the pull rod 214 pulls the diaphragm 107 to pull fuel into the chamber 111. As the roller 212 moves to a concave portion of the protrusion, the pull rod 214 no longer pulls the diaphragm 107, which allows the force stored in the spring 107 to push the diaphragm 107 into the chamber 111, which pushes the fuel out of the chamber 111.

In this example, even if the roller 212, follower arm 141, and pull rod 214 oscillate quickly, the process is not disrupted. The diaphragm 107 applies a small force in a direction away from the recoil pump 200. If the chamber 111 is empty, the diaphragm 107 and pull rod 214 holds the follower arm 141 such that the arm 141 does not contact the protrusions 211. Accordingly, as fuel flows out of the chamber 11, the roller 212 does not contact the cam until a specific volume of fuel has flowed out of the chamber 111. When the roller 212 is out of contact with the protrusions 211, no force or torque is applied to the recoil. Thus, the roller 212, the follower arm 141, and the pull rod 214 are in a neutral or floating state.

Figure 14A:
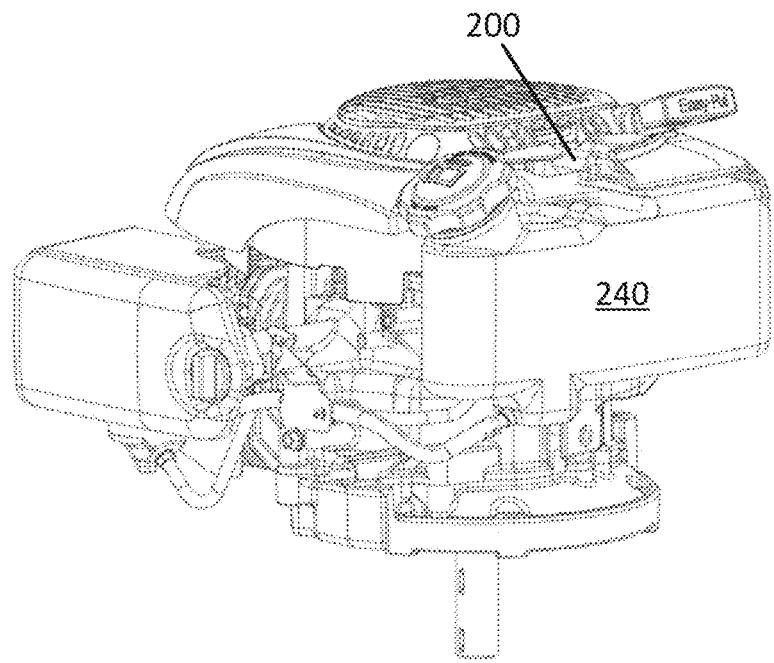
FIGS. 14A and 14B illustrate the fuel recirculation system mounted on the fuel tank of an engine.
Figure 14B:
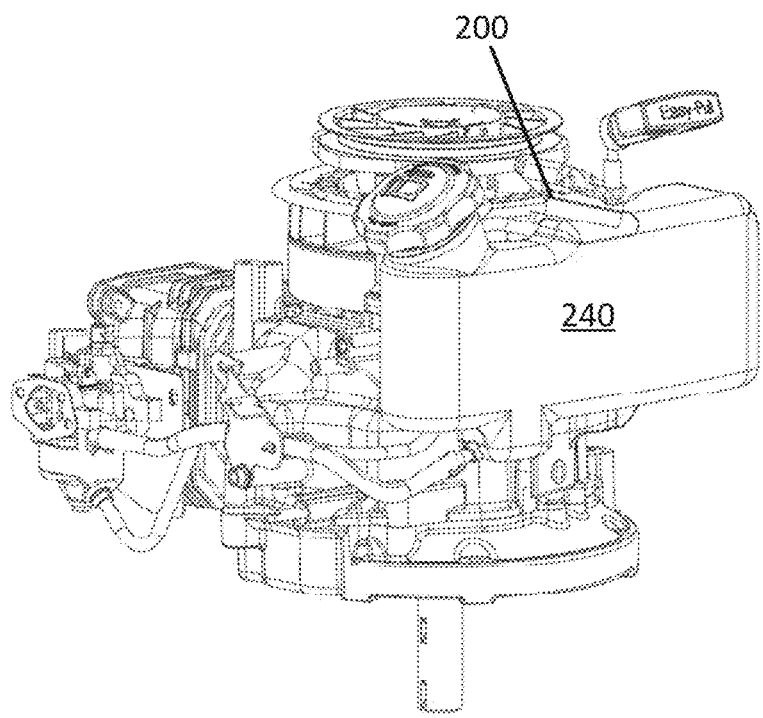

FIGS. 14A and 14B illustrate the fuel recirculation system including the pump 200 mounted with the fuel tank on an engine.

Figure 15A:
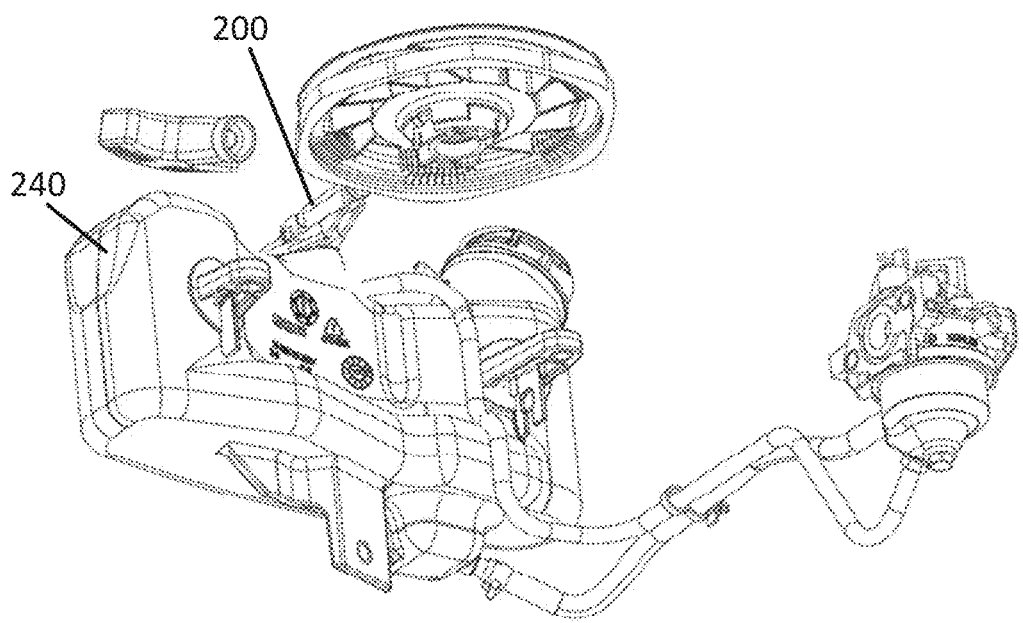
FIGS. 15A and 15B illustrate another embodiment of fuel recirculation system.
Figure 15B:
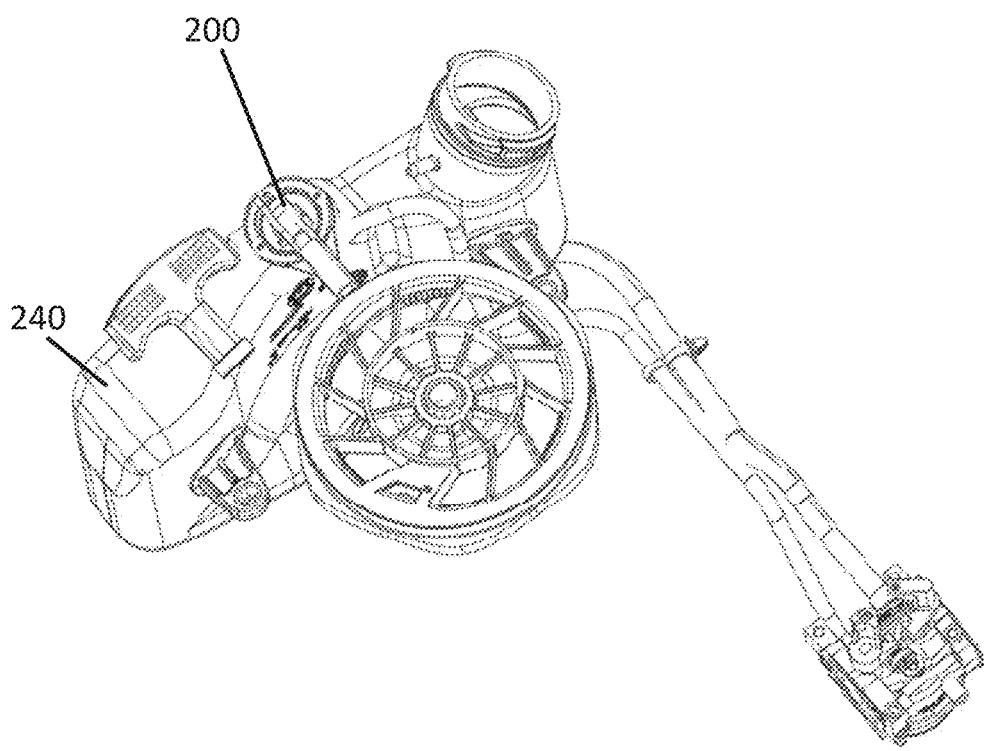
Figure 16A:
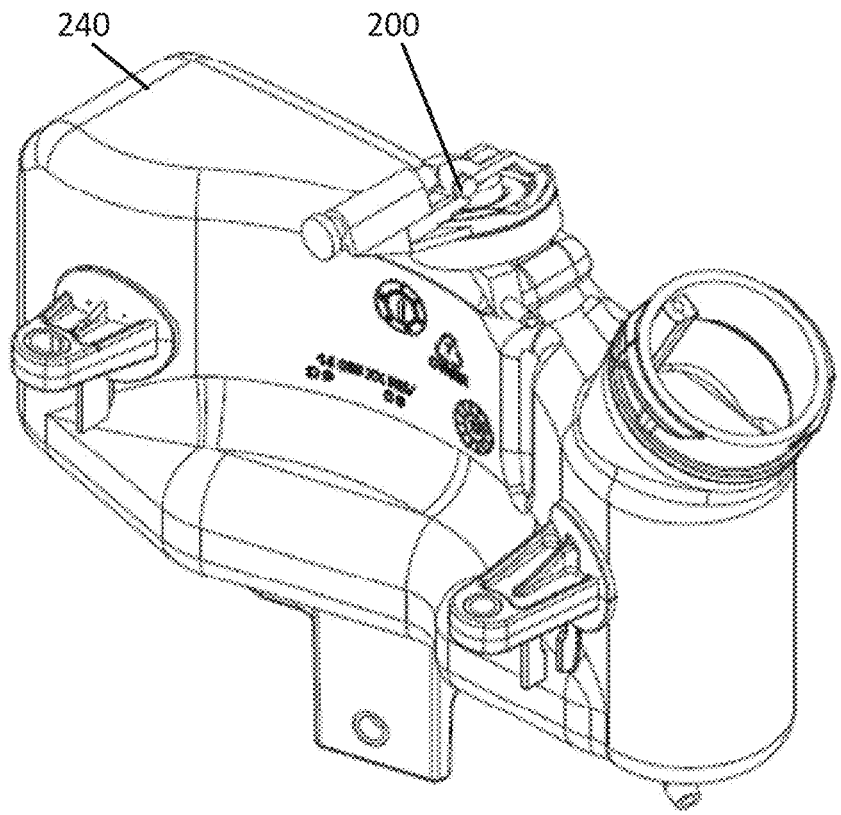
FIGS. 16A and 16B illustrate a fuel tank mounted pump for the embodiment of FIGS. 15A and 15B.
Figure 16B:
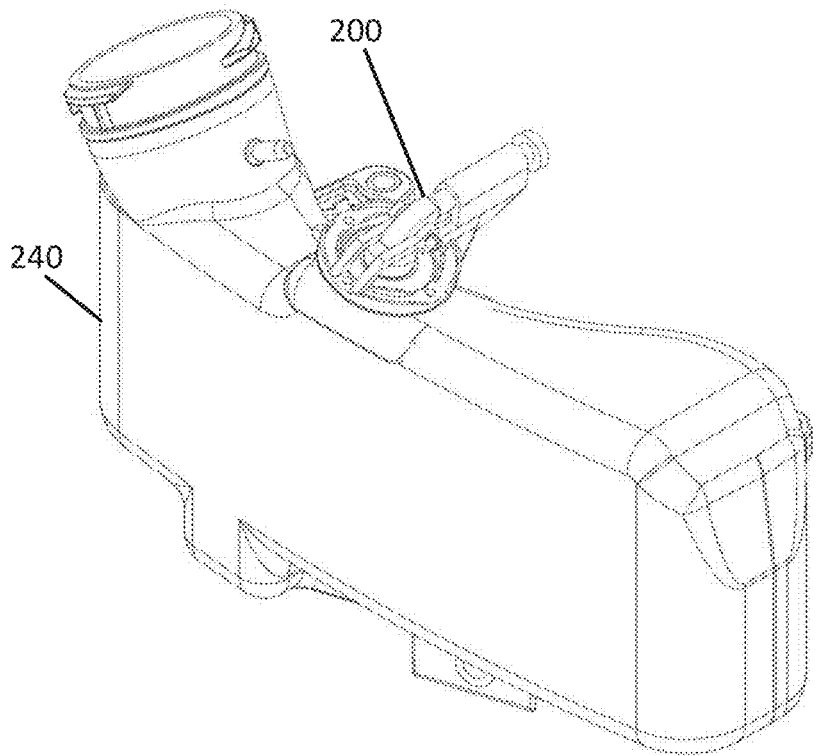

FIGS. 15A and 15B illustrate another embodiment of fuel recirculation system. In this embodiment, the recoil pump 200 is mounted directly on the fuel tank 240. FIGS. 16A and 16B illustrate a fuel tank mounted pump for the embodiment of FIGS. 15A and 15B.

Figure 17A:
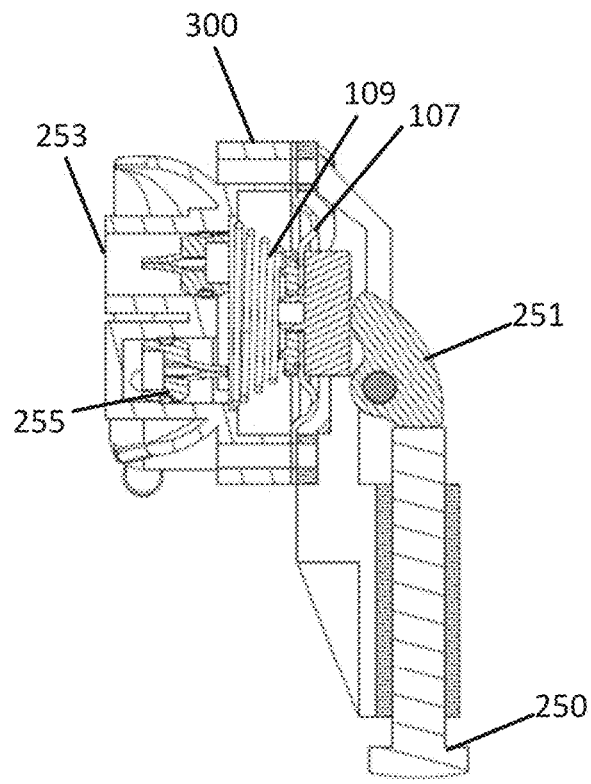
FIGS. 17A and 17B illustrate detailed views for the fuel tank mounted pump.
Figure 17B:
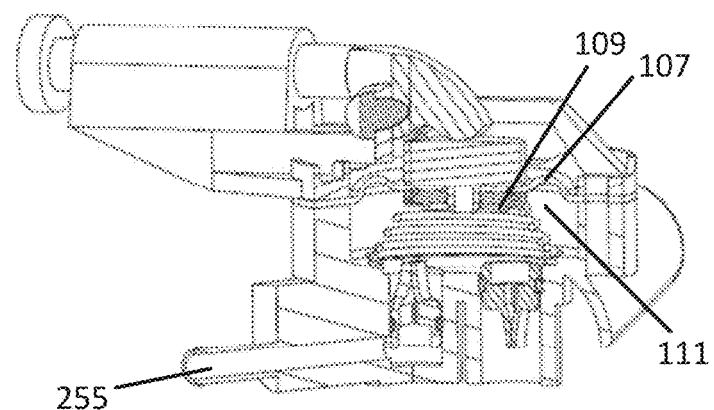

FIGS. 17A and 17B illustrate detailed views for the fuel tank mounted pump 300. One advantage of the fuel tank mounted pump is the pump outlet hose is no longer necessary. The discharge port opens directly into the fuel tank.

The fuel tank mounted pump includes a conical spring 109, a diaphragm 107, a lever 251, a cam follower 250, an outlet 253 for the check valve, and an inlet 255 for the check valve. The cam follower 250 receives a force in a first direction from the cam lobes of the recoil started. The force in the first direction is translated to a second direction through lever 251. The second force is applied to the piston of the pump, which depressed the conical spring 109 and the diaphragm 107, which changes the size of the pump cavity to push fuel out through the outlet 253 and draw new fuel through the inlet 255 into the check valve.

Figure 18:
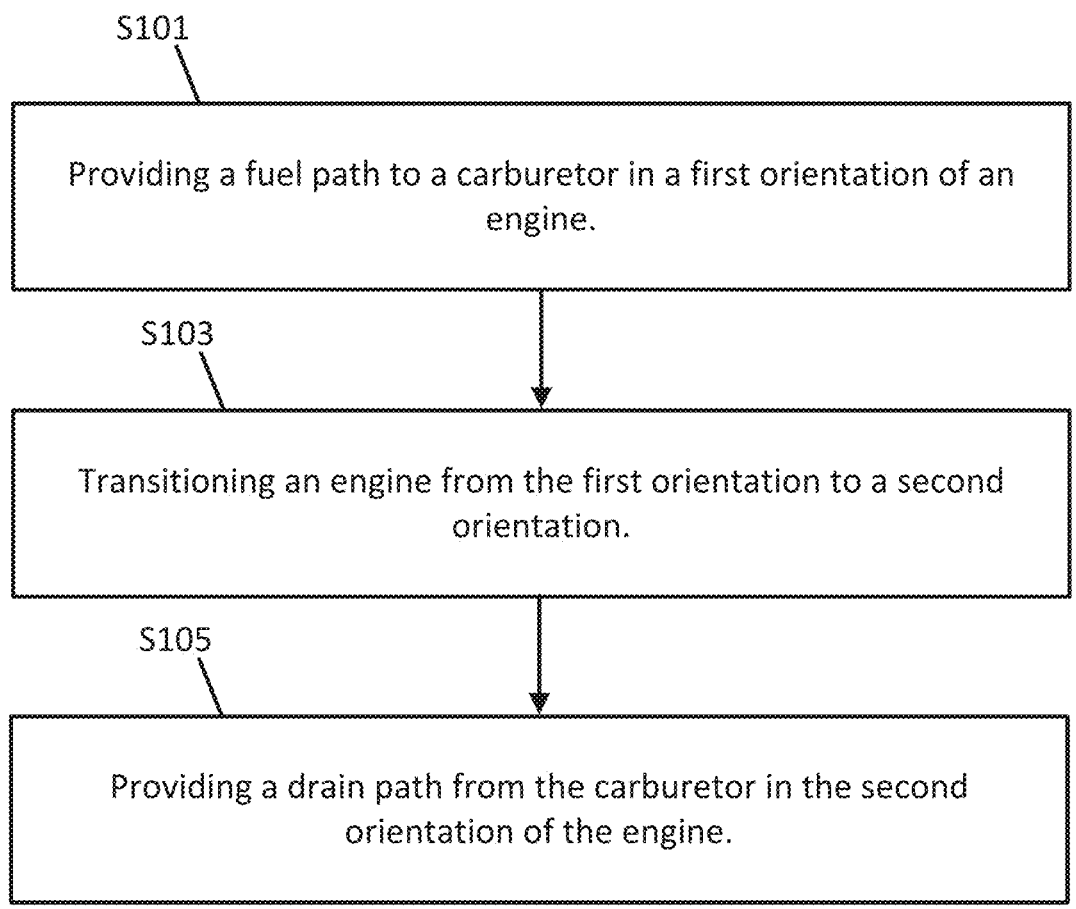
FIG. 18 illustrates an example flowchart for operation of an orientation controlled carburetor drain.

FIG. 18 illustrates an example flowchart for operation of an orientation controlled carburetor drain. Additional, different, or fewer acts may be included.

At act S101, a first fuel path is provided to a carburetor in a first orientation of an engine. The first orientation of the engine may be the operating orientation of the engine. For example, when the engine is included on a wheeled device, the operating orientation is the orientation in which all or a majority of the wheels are resting on the ground or in a plane substantially perpendicular to the direction of gravity.

At act S103, the engine including the carburetor is transitioned or moved from the first orientation to a second orientation. In one example, the engine may be mounted on a wheeled machine that is placed in a storing position. For example, the wheeled machine may be tipped up for storing in an orientation perpendicular to an operating orientation or hanging on a wall or mount in the orientation perpendicular to the operating position.

At act S103, a drain path from the carburetor in the second orientation of the engine. The drain path may be opened through a check valve. The drain path may allow fuel to flow through the drain path from the carburetor to return to the fuel tank of the engine. The drain path may be referred to as a return path.

Figure 19:
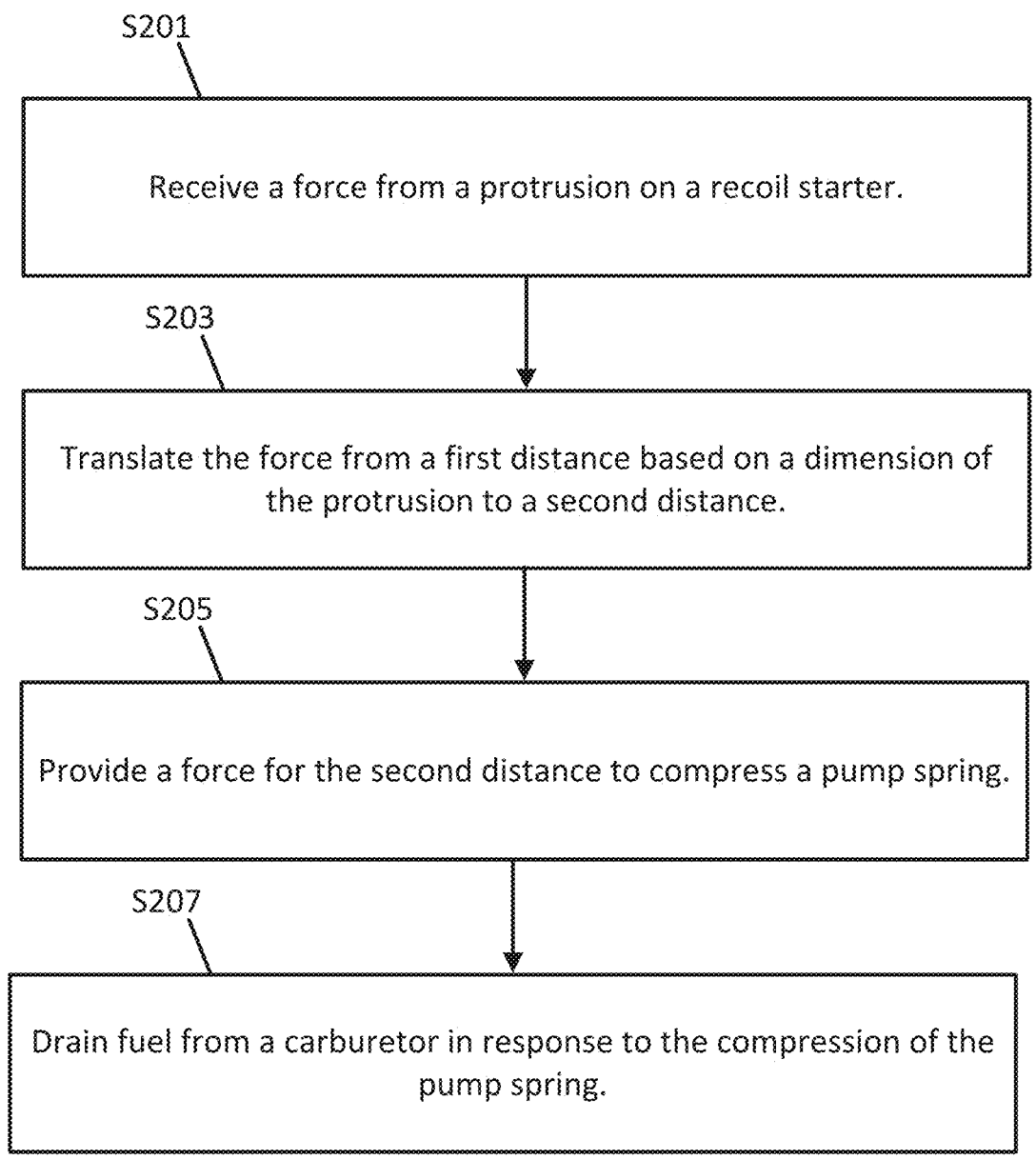
FIG. 19 illustrates an example flowchart for a recoil actuated carburetor drain pump.

FIG. 19 illustrates an example flowchart for a recoil actuated carburetor drain pump. Additional, different, or fewer acts may be included.

At act S201, receive a force at the recoil actuated carburetor drain pump from a protrusion on a recoil starter. The recoil starter may include protrusions or lobes that are spaced apart. As the recoil started rotates, the protrusions come in and out of contact with the recoil actuated carburetor drain pump.

At act S203, the recoil actuated carburetor drain pump translates the force from a first distance based on a dimension of the protrusion to a second distance. For example, the recoil actuated carburetor drain pump may include a lever in which the ratio of the lever arms is proportional to the first distance and the second distance.

At act S205, the recoil actuated carburetor drain pump provides a force for the second distance to compress a pump spring. As a result of compressing the pump spring, the recoil actuated carburetor drain pump is activated to drain fuel from a carburetor, as shown by act S207.

The small internal combustion engine may be applicable to chainsaws, lawn mowers, wood chippers, stump grinders, concrete trowels, mini excavators, concrete saws, portable saw mills, weed trimmers, all-terrain vehicles, wood splitters, pressure washers, garden tillers, tractors, plows, snow blowers, welding equipment, generators, and other devices.

The engine 10 may include one cylinder, two cylinders or another number of cylinders. The one or more cylinders may generate noise or sound waves as a result of the oscillations of one or more pistons through the one or more cylinders, which are shaped to receive the one or more pistons. The one or more pistons may be guided through the one or more cylinders by a connecting rod that is connected to a crankshaft by a crankpin. A combustion chamber includes a combustion chamber adjacent to a head of the piston. The combustion chamber is formed in a cylinder head. In one phase of a combustion cycle for the piston, the exhaust port is blocked from the combustion chamber by the piston, and in a subsequent phase, the exhaust port is in gaseous connection with the combustion chamber to release exhaust gas through the exhaust port to a muffler.

The phrases "coupled with" or "coupled to" include directly connected to or indirectly connected through one or more intermediate components. Additional, different, or fewer components may be provided. Additional, different, or fewer components may be included.

The acts of FIG. 18 may be initiated by one or more controllers including a specialized processor, one or more memories and a communication interface. The one or more controllers may operate the check valve by generating open and close commands for the check valve. The open and close commands may be generated in response to data from a sensor (e.g., magnetic sensor or gravity sensor) that describes the orientation of the engine. Instructions for the one or more controllers may be embodied on a non-transitory computer readable medium.

The recoil actuated carburetor drain pump may be controlled according to one or more controllers including a specialized processor, one or more memories and a communication interface. The one or more controllers may enable or disable the recoil actuated carburetor drain pump. The one or more controllers may generate an enable command when the carburetor should be drained. For example, the controller may determine when a predetermined time (e.g., one week or one month) has elapsed. The predetermined time may be selected so that the drain pump is actuated after the engine is stored. Instructions for the one or more controllers may be embodied on a non-transitory computer readable medium.

Figure 20A:
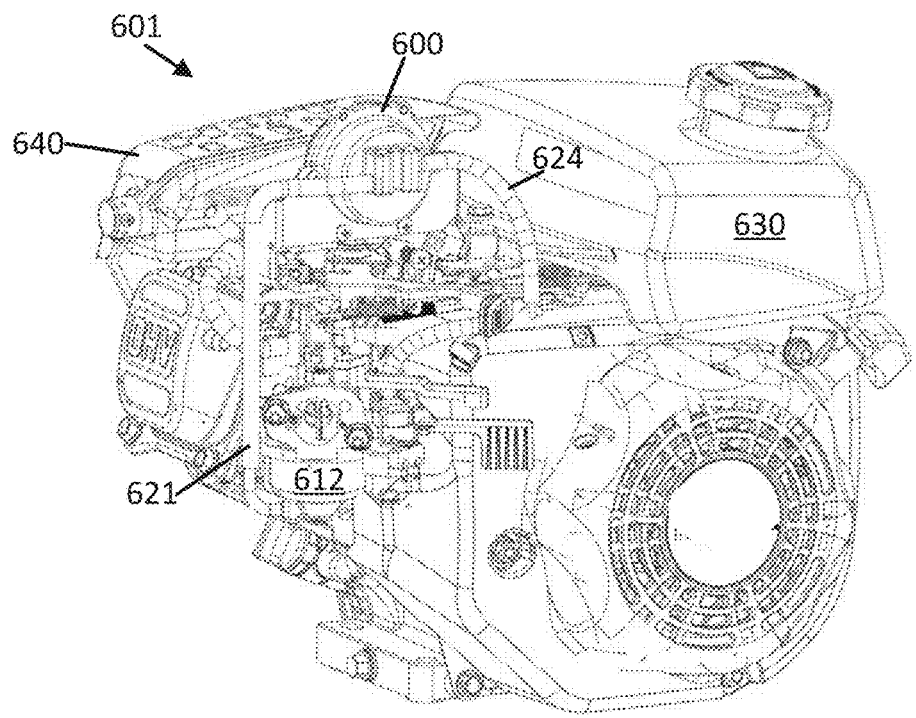
FIGS. 20A and 20B illustrate an engine including a recirculation system using an enclosed fluid.
Figure 20B:
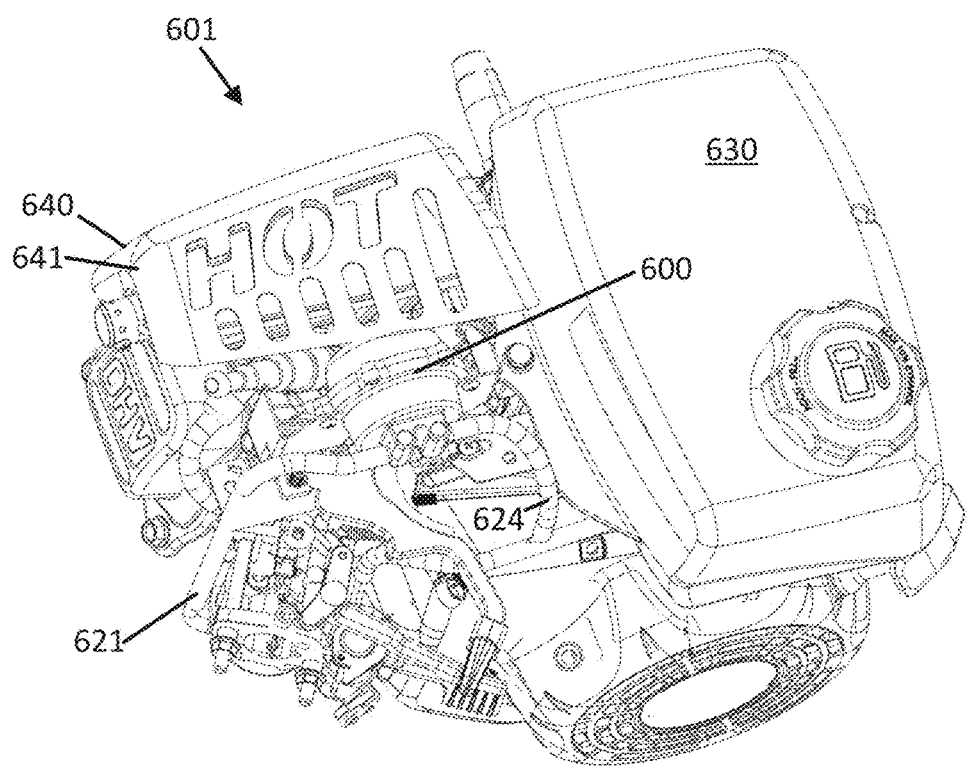
Figure 21:
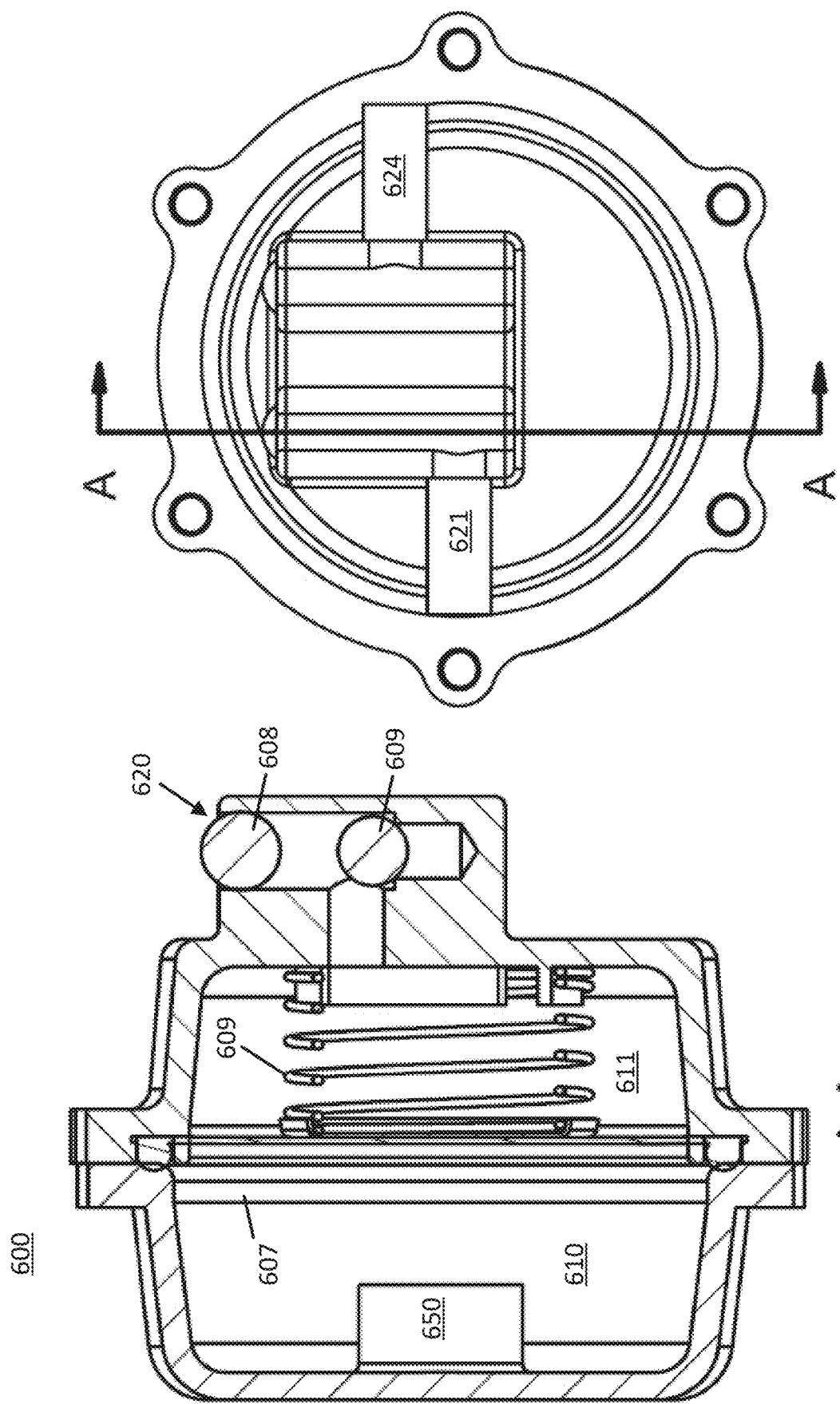
FIG. 21 illustrates an example recirculation system using an enclosed fluid in a first state.
Figure 22:
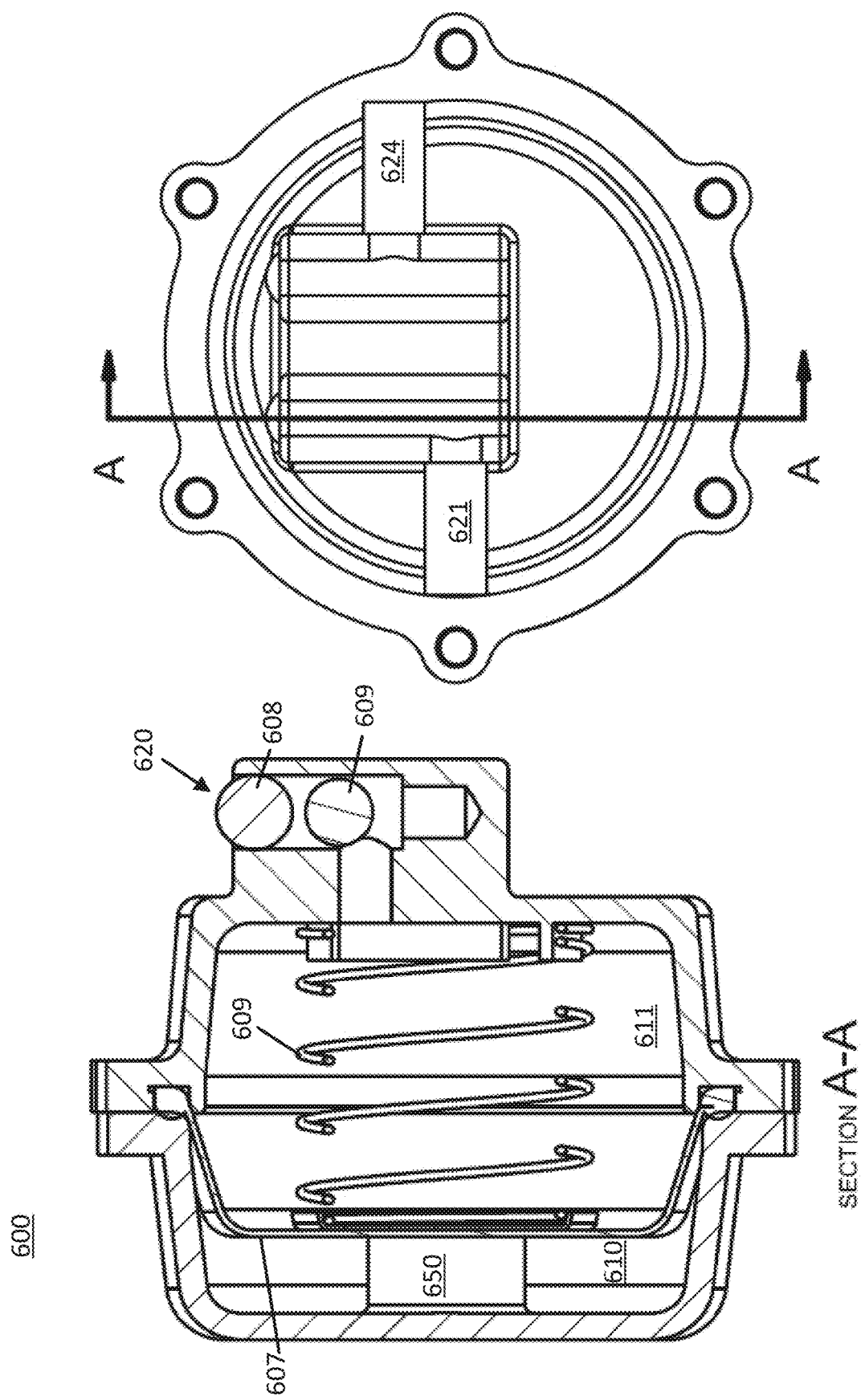
FIG. 22 illustrates an example recirculation system using an enclosed fluid in a second state.

FIGS. 20A and 20B illustrate an engine 601 including a recirculation system 600 using an enclosed fluid. FIG. 21 illustrates an example recirculation system 600 using an enclosed fluid in a first state. FIG. 22 illustrates an example recirculation system 600 using an enclosed fluid in a second state. The recirculation system 600 may pump fuel from the carburetor bowl 612 through a drain line 621 to the recirculation system 600 and through a return line 624 from the recirculation system 200 to the fuel tank 630. The recirculation system 600 may include no mechanical parts to drive the pump. Instead, the diaphragm 607 pumps fuel through the action of gas expansion. Additional, different, or fewer components may be included.

The recirculation system 600 may include two or more chambers such as a fuel chamber 611 and a fluid chamber 610 integrated into a single device and separated by a diaphragm 607. The diaphragm 607 may be formed of rubber, plastic, or another durable but flexible material. The fluid chamber 610 includes a fluid that expands and contracts in response to the ambient environment. For example, the fluid may expand or contract in response to temperature changes. The recirculation system 600 may be placed near (e.g., within a predetermined distance of) a heat source such as muffler 640. In some examples, the fuel chamber 611 and fluid chamber 610 are separated. The fluid chamber 610 may be spaced apart from the recirculation system 600 and provide fluid to a third chamber in communication with the fuel chamber 611.

The fuel chamber 611 includes a drain line 621 to the carburetor bowl and the return line 624 to fuel tank. A check valve 620 may include a plug 608 and a check ball 609. The check valve 620 directs the flow of fuel from the carburetor bowl and to the fuel tank 630. The plug 608 may provide a clearance hole for the check ball 609. The plug 608 limits how far the check ball 609 can travel in the cavity. In FIG. 21, the check ball 609 is in seated position in which fuel is pushed out of the fuel chamber 611. In FIG. 22, the check ball 609 is in an inlet flow position. The check ball 609 may be a drain return portion of the check valve 620 regulates the flow of fuel from the carburetor and prevents the flow of fuel back to the carburetor bowl from the recirculation system 600. The check ball 609 may be a fuel shutoff valve portion of the check valve 620 that regulates the flow of fuel to fuel tank 630 and prevents the flow of fuel from the fuel tank to the recirculation system 600. Alternatively, a reed valve or another type of valve may be used for either or both of the drain return portion or the fuel shutoff valve portion.

The fluid may be any gas or liquid. The fluid may be dry air. Other example fluids may include air, helium, oil, or water. The fluid chamber 610 is sealed from the ambient environment and the fuel chamber 611. The air chamber 610 may be connected to no tubes and be sealed from all other components. The recirculation system 600 operates on the principal of thermal expansion of as gas. Thus, the fluid in the fluid chamber 610 has a first volume and a first temperature and a second volume at a second temperature, with the first volume being greater than the second volume and the first temperature being greater than the second temperature.

For example, FIG. 21 illustrates a state of the recirculation system 600 in which the fluid in the fluid chamber 610 has expanded, for example, due to heat causes by running the engine 600. The spring 609 has stored energy that places a force on the diaphragm 607 in a direction that urges the diaphragm 607 to make the fluid chamber 610 smaller (e.g., to the left in FIG. 21). However, because the fluid is expanded, the fluid prevents the diaphragm 607 from compressing the fluid. In this way, when the engine 600 is running, the fluid in the fluid chamber 610 expands and pushes the diaphragm 607 and spring 609 toward the check valve 620, causing the check valve 620 to open a path from the fuel chamber 611 to the fuel tank and pushing the fuel in the fuel chamber 611 into the fuel tank 630.

However, as the fluid cools, the fluid takes less space, which allows the spring 608 to press the diaphragm 607 into the space previously occupied by the fluid. FIG. 22 illustrates a state of the recirculation system 600 in which the fluid in the fluid chamber 610 has compressed, for example, due to the engine 600 being cooled (i.e., not operated for some time). The diaphragm 607 and spring 609 create a vacuum to draw fuel out of the carburetor bowl for storage. The compression of the fluid chamber 610 allows for expansion of the fuel chamber 611 and causes the check valve 620 to open a path from the carburetor bowl to the fuel chamber 611. The fuel shutoff valve portion of the check valve 620 also prevents fuel from the fuel tank 630 from being drawn into the fuel chamber 611.

The next time that the engine 600 is started and heats up, the fluid in the fluid chamber 610 again heats up, pushes the diaphragm 607 to the right, the fuel shutoff valve portion of the check valve 620 is opened, and the stored fuel (originally from the carburetor bowl) is pushed into the fuel tank 630.

The fluid chamber 610 may include spacer 650 as a diaphragm travel limiting device to maintain a minimum fluid volume in the chamber 610. The spacer 650 provides an accurate volume of fluid during assembly of the pump or recirculation system 600 and also prevents the diaphragm 607 from adhering to the inner chamber wall during prolonged periods of engine storage. The spacer 650 may be formed of metal, plastic or another material safe for extended exposure to the fuel. The dimensions of the spacer 650 may be selected as a proportion or predetermined fraction of the fluid chamber 610 or of the carburetor bowl.

In addition to within a predetermined distance to the muffler 640 as shown in FIGS. 20A and 20B, the recirculation system 600 may be secured to the engine 601 in a variety of locations. The recirculation system 600 may be formed integrally with a heat shield 641 for muffler 640. The recirculation system 600 may be installed near the muffler 640 or another heat producing component using a bracket. The size (e.g., thickness) of the bracket and/or the number of holes in the bracket may be adjusted to modify the heat flow from the head producing components to the recirculation system 600. The recirculation system 600 may be mounted near the outlet side of coolant system where hot air passes from the engine. The recirculation system 600 may be mounted near the crank case, which also heats up during operation of the engine. Other locations for the recirculation system 600 are possible.

In another example, the recirculation system 600 may be mounted near a heat pipe. The heat pipe allows heat to travel from the heat producing element to the reticulation system 600. The heat pipe has a high thermal conductivity.

In another example, exhaust may be routed from the muffler 640 to the recirculation system 600 using a tube. The exhaust retains heat to cause the expansion of the fluid in the recirculation system 600.

In another example, the recirculation system 600 includes an auxiliary heat source (e.g., a battery powered heating element) that heats up in response to the engine running. The auxiliary heat source may be connected to the battery of the engine. The auxiliary heat source heats the fluid in the fluid chamber 610.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those skilled in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving, at a rod, a force from a recoil starter;
   providing, from the rod, a first force for a pump including a diaphragm in contact with the rod;
   providing, from a spring, a second force for the pump; and
   draining fuel from a carburetor via the pump.

2. The method of claim 1, wherein draining fuel from the carburetor via the pump further comprises:
   pumping fuel to a fuel tank.

3. The method of claim 1, further comprising:
   opening a valve in response to operation of the pump.

4. A fuel recirculation system for an engine, the fuel recirculation system comprising:
   a chamber configured to store fuel;
   a diaphragm configured to push at least a portion of the fuel out of the chamber;
   a rod driven by a recoil and configured to apply a first force to the diaphragm; and
   a spring configured to apply a second force to the diaphragm.

5. The fuel recirculation system of claim 4, wherein the spring is a conical spring.

6. The fuel recirculation system of claim 5, wherein the rod is movable by a recoil starter.

7. The fuel recirculation system of claim 4, further comprising:
   a carburetor drain line in communication with the chamber.

8. The fuel recirculation system of claim 7, further comprising:
   a valve on the carburetor drain line.

9. The fuel recirculation system of claim 8, wherein the valve is configured to drain the chamber in a predetermined orientation.

10. The fuel recirculation system of claim 9, wherein the predetermined orientation is a storage orientation.

11. A carburetor comprising:
    a carburetor bowl configured to store fuel and provide the fuel to an air passage;

a fuel supply pipe connected a fuel tank and the carburetor bowl;

a fuel drain pipe connected to the carburetor bowl;

a chamber configured to store fuel;

a diaphragm configured to push at least a portion of the fuel out of the chamber to the fuel drain pipe;

a rod driven by a recoil and configured to apply a first force to the diaphragm; and a spring configured to apply a second force to the diaphragm.

12. The carburetor of claim 11, further comprising:

a valve on the fuel drain line.

13. The carburetor of claim 12, wherein the valve is configured to drain the chamber in a predetermined orientation.

14. The carburetor of claim 13, wherein the predetermined orientation is a storage orientation.

15. The carburetor of claim 11, wherein the rod is movable by a recoil starter.

16. The carburetor of claim 11, wherein the fuel drain pipe returns fuel to a fuel tank.

17. The carburetor of claim 11, wherein the fuel drain pipe returns fuel to the fuel supply line.

18. The carburetor of claim 11, wherein the spring is a conical spring.

* * * * *